(12) United States Patent
Miller et al.

(10) Patent No.: US 10,091,904 B2
(45) Date of Patent: Oct. 2, 2018

(54) STORAGE SLED FOR DATA CENTER

(71) Applicant: INTEL CORPORATION, Santa Clara, CA (US)

(72) Inventors: Steven C. Miller, Livermore, CA (US); Michael Crocker, Portland, OR (US); Aaron Gorius, Upton, MA (US); Paul Dormitzer, Acton, MA (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 15/394,321

(22) Filed: Dec. 29, 2016

(65) Prior Publication Data
US 2018/0027684 A1 Jan. 25, 2018

Related U.S. Application Data

(60) Provisional application No. 62/427,268, filed on Nov. 29, 2016, provisional application No. 62/376,859, filed on Aug. 18, 2016, provisional application No. 62/365,969, filed on Jul. 22, 2016.

(51) Int. Cl.
H05K 7/14 (2006.01)
(52) U.S. Cl.
CPC .................... *H05K 7/1489* (2013.01)
(58) Field of Classification Search
CPC .................................................. H05K 7/1489
See application file for complete search history.

(56) References Cited

U.S. PATENT DOCUMENTS

| 5,652,697 | A | 7/1997 | Le | |
|---|---|---|---|---|
| 9,167,705 | B2 | 10/2015 | Kyle | |
| 9,433,119 | B2 | 8/2016 | Canfield et al. | |
| 9,448,599 | B2 | 9/2016 | Ehlen et al. | |
| 9,456,519 | B2* | 9/2016 | Bailey | H05K 7/1488 |
| 9,706,677 | B2* | 7/2017 | Cravens | H05K 7/1489 |
| 2001/0001529 | A1 | 5/2001 | Behl et al. | |
| 2005/0012119 | A1 | 1/2005 | Herner et al. | |
| 2006/0242380 | A1 | 10/2006 | Korgaonkar et al. | |
| 2007/0230109 | A1 | 10/2007 | Starr et al. | |
| 2009/0063510 | A1 | 3/2009 | Yamagishi | |
| 2009/0097200 | A1* | 4/2009 | Sharma | G06F 1/18 361/688 |
| 2010/0142544 | A1 | 6/2010 | Chapel et al. | |
| 2012/0020663 | A1 | 1/2012 | McLaren et al. | |

(Continued)

FOREIGN PATENT DOCUMENTS

WO 2012113807 8/2012

OTHER PUBLICATIONS

International Search Report received for PCT Patent Application No. PCT/US2017/038688, dated Oct. 23, 2017, 7 pages.

(Continued)

*Primary Examiner* — Lisa Lea Edmonds

(57) ABSTRACT

Examples may include a sled for a rack of a data center including physical storage resources. The sled comprises an array of storage devices and an array of memory. The storage devices and memory are directly coupled to storage resource processing circuits which are themselves, directly coupled to dual-mode optical network interface circuitry. The dual-mode optical network interface circuitry can have a bandwidth equal to or greater than the storage devices.

25 Claims, 12 Drawing Sheets

(56) References Cited

U.S. PATENT DOCUMENTS

| | | |
|---|---|---|
| 2013/0166820 A1 | 6/2013 | Batwara et al. |
| 2014/0085807 A1* | 3/2014 | Ning ................... G06F 1/20 |
| | | 361/679.47 |
| 2014/0140689 A1 | 5/2014 | Dahlfort et al. |
| 2014/0188996 A1 | 7/2014 | Lie et al. |
| 2014/0281152 A1 | 9/2014 | Karamcheti et al. |
| 2015/0113235 A1 | 4/2015 | Morris et al. |
| 2015/0189787 A1* | 7/2015 | Bailey ................. H05K 7/1489 |
| | | 361/679.48 |
| 2015/0350023 A1 | 12/2015 | Srinivas et al. |
| 2015/0355686 A1 | 12/2015 | Heyd et al. |
| 2015/0372781 A1 | 12/2015 | Frankel et al. |
| 2016/0055119 A1 | 2/2016 | Egi et al. |
| 2016/0073545 A1* | 3/2016 | Cravens ................. G06F 1/187 |
| | | 361/679.32 |
| 2016/0132265 A1 | 5/2016 | Yi et al. |
| 2016/0286682 A1 | 9/2016 | Canfield et al. |
| 2016/0328159 A1 | 11/2016 | Coddington et al. |
| 2017/0031945 A1 | 2/2017 | Sarab et al. |
| 2017/0055362 A1 | 2/2017 | Bailey et al. |
| 2017/0094828 A1 | 3/2017 | Van Pelt et al. |
| 2017/0135243 A1 | 5/2017 | Canfield et al. |

OTHER PUBLICATIONS

International Search Report received for PCT Patent Application No. PCT/US2017/038686, dated Oct. 13, 2017, 3 pages.
International Search Report received for PCT Patent Application No. PCT/US2017/038660, dated Oct. 17, 2017, 5 pages.

\* cited by examiner

*200*

STORAGE SLED FOR DATA CENTER

RELATED APPLICATIONS

This application claims priority to: United States Provisional Patent Application entitled "Framework and Techniques for Pools of Configurable Computing Resources" filed on Nov. 29, 2016 and assigned Ser. No. 62/427,268; United States Provisional Patent Application entitled "Scalable System Framework Prime (SSFP) Omnibus Provisional II" filed on Aug. 18, 2016 and assigned Ser. No. 62/376,859; and United States Provisional Patent Application entitled "Framework and Techniques for Pools of Configurable Computing Resources" filed on Jul. 22, 2016 and assigned Ser. No. 62/365,969, all of which are hereby incorporated by reference in their entirety.

TECHNICAL FIELD

Examples described herein are generally related to data centers and particularly to storage sleds to couple physical storage resources in a data center.

BACKGROUND

Advancements in networking have enabled the rise in pools of configurable computing resources. A pool of configurable computing resources may be formed from a physical infrastructure including disaggregate physical resources, for example, as found in large data centers. The physical infrastructure can include a number of resources having processors, memory, storage, networking, power, cooling, etc. Management entities of these data centers can aggregate a selection of the resources to form servers and/or computing hosts. These hosts can subsequently be allocated to execute and/or host system SW (e.g., OS s, VMs, Containers, Applications, or the like). The amount of data storage in data centers continues to increase, often at exponential levels, thus requiring physical storage resources in the data center. The present disclosure is directed to such physical storage resources.

DETAILED DESCRIPTION

Figure 1:
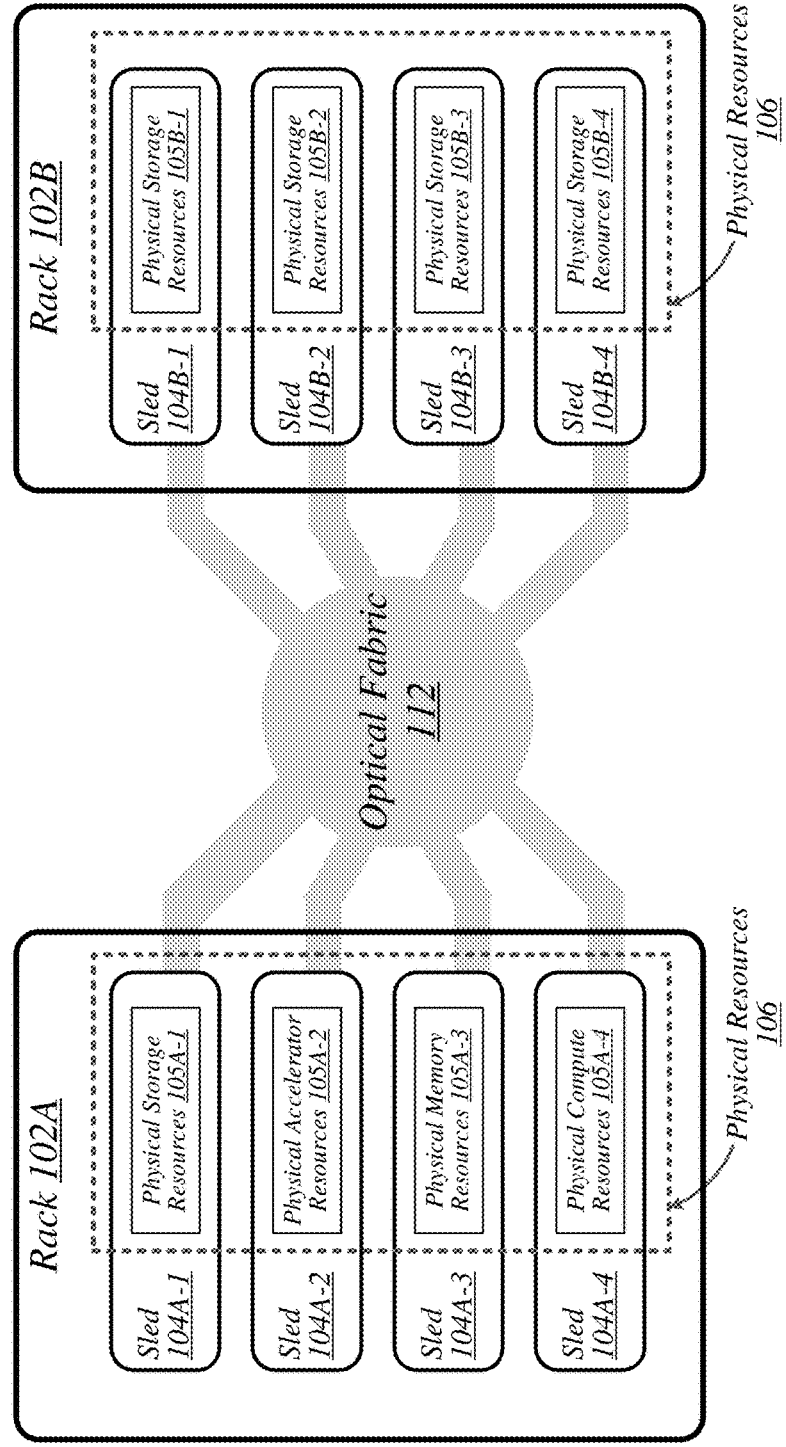
FIG. 1 illustrates a first example data center.

Data centers may generally be composed of a large number of racks that can contain numerous types of hardware or configurable resources (e.g., processing units, memory, storage, accelerators, networking, fans/cooling modules, power units, etc.). The types of hardware or configurable resources deployed in data centers may also be referred to as physical resources or disaggregate elements. It is to be appreciated, that the size and number of physical resources within a data center can be large, for example, on the order of hundreds of thousands of physical resources. Furthermore, these physical resources can be pooled to form virtual computing platforms for a large number and variety of computing tasks.

These physical resources are often arranged in racks within a data center. The present disclosure provides racks arranged to receive a number of sleds, where each sled can house a number of physical resources. In particular, a sled to couple a number of physical storage resources (e.g., solid-state-drives (SSDs), or the like) to a data center is described. The sled can couple to a rack using automated techniques, such as, robotic coupling or manipulation, is provided. The sled can accommodate a number of storage devices (e.g., SSDs, or the like) and can couple the storage devices to an optical fabric provided in the data center. Furthermore, the sled can accommodate automated removal and/or installation of the storage devices. More specifically, as will be described in greater detail below, the sled can accommodate robotic installation and/or removal of the storage devices.

The sled can include a dual-mode optical network interface operable to couple to the storage devices on the sled (e.g., based on electrical signaling) and couple to an optical fabric in the data center (e.g., based on optical signaling). This, and other features of the present disclosure will be described in greater detail below.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

FIG. 1 illustrates a conceptual overview of a data center 100 that may generally be representative of a data center or other type of computing network in/for which one or more techniques described herein may be implemented according to various embodiments. As shown in this figure, data center 100 may generally contain a plurality of racks, each of which may house computing equipment comprising a respective set of physical resources. In the particular non-limiting example depicted in this figure, data center 100 contains two racks 102A to 102B. Each of these two racks 102A to 102B may generally house a number of sleds. As shown in this figure, each of racks 102A to 102B contains four sleds 104A-1 to 104A-4 and 104B-1 to 104B-4, respectively. The depicted sleds and racks house computing equipment comprising respective sets of physical resources 105A/B. In particular, physical resources 105A-1 to 105A-4 and 105B-1 to 105B-4 are depicted. A collective set of physical resources 106 of data center 100 includes the various sets of physical resources 105 (e.g., 105A-1 to 105A-4 and 105B-1 to 105B-4) that are distributed among racks 102A to 102B.

Physical resources 106 may include resources of multiple types, such as—for example—processors, co-processors, accelerators, field-programmable gate arrays (FPGAs), memory, and storage. The embodiments are not limited to these examples. In this particular non-limiting example, physical resources 105A may thus be made up of the respective sets of physical resources housed in rack 102A, which includes physical storage resources 105A-1, physical accelerator resources 105A-2, physical memory resources 105A-3, and physical compute resources 105A-4 comprised in the sleds 104A-1 to 104A-4 of rack 102A. In some implementations, a rack may include a number of like physical resources. For example, rack 102B is depicted including physical storage resources housed in each of sleds 104B-1 to 104B-4 of rack 102B. More specifically, sleds 104B-1 to 104B-4 respectively house, physical storage resources 105B-1, physical storage resources 105B-2, physical storage resources 105B-3, and physical storage resources 105B-4.

It is noted, that embodiments are not limited to this example. Furthermore, each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, at least some components may operate at higher frequencies and power levels than in typical systems, thereby increasing performance. Furthermore, the sleds are configured to blindly mate with power and data communication cables in each rack 102A to 102B, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twister pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local.

More specifically, data center 100 may feature optical fabric 112. Optical fabric 112 may generally comprise a combination of optical signaling media (such as optical cabling) and optical switching infrastructure via which any particular sled in data center 100 can send signals to (and receive signals from) each of the other sleds in data center 100. The signaling connectivity that optical fabric 112 provides to any given sled may include connectivity both to other sleds in a same rack and sleds in other racks. In the particular non-limiting example depicted in this figure, data center 100 comprises two racks (e.g., rack 102A to 102B) each including four sleds (e.g., 104A-1 to 104A-4 and 104B-1 to 104B-4, respectively). Thus, in this example, data center 100 comprises a total of eight sleds. Via optical fabric 112, each such sled may possess signaling connectivity with each of the seven other sleds in data center 100. For example, via optical fabric 112, sled 104A-1 in rack 102A may possess signaling connectivity with sled 104A-2, 104A-3 and 104A-4 in rack 102A, as well as the four other sleds 104B-1, 104B-2, 104B-3, and 104B-4 that are distributed among the other rack 102B of data center 100. The embodiments are not limited to this example.

In various embodiments, dual-mode optical switches (refer to FIGS. 5-10) may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of optical fabric 112. Thus, as depicted, with respect to any particular pair of sleds in data center 100, signaling connectivity via the optical fabric may provide support for link-layer connectivity via both Ethernet links and HPC links. Thus, both Ethernet and HPC communications can be supported by a single high-bandwidth, low-latency switch fabric. The embodiments are not limited to this example. However, it is worthy to note, that the dual-mode optical switches provide for separate fault domains within a single sled. As such, information can be written across fault domains at the sled level, as opposed to the rack level to provide data loss, corruption, or failure mitigation at the sled level.

The racks 102A and 102B of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A and 102B include integrated power sources that receive a greater voltage than is typical for power sources. In particular examples, each of the sleds can include an associated power supply. The increased voltage enables the power sources to provide additional power to the components on each sled, enabling the components to operate at higher than typical frequencies.

As noted, the present disclosure provides sleds, and particularly, sleds comprising and/or arranged to comprise physical storage resources. Examples of such sleds are provides with respect to FIGS. 5-10. However, a number of example racks arranged to house such sleds are depicted and described before, with respect to FIGS. 2-4.

Figure 2:
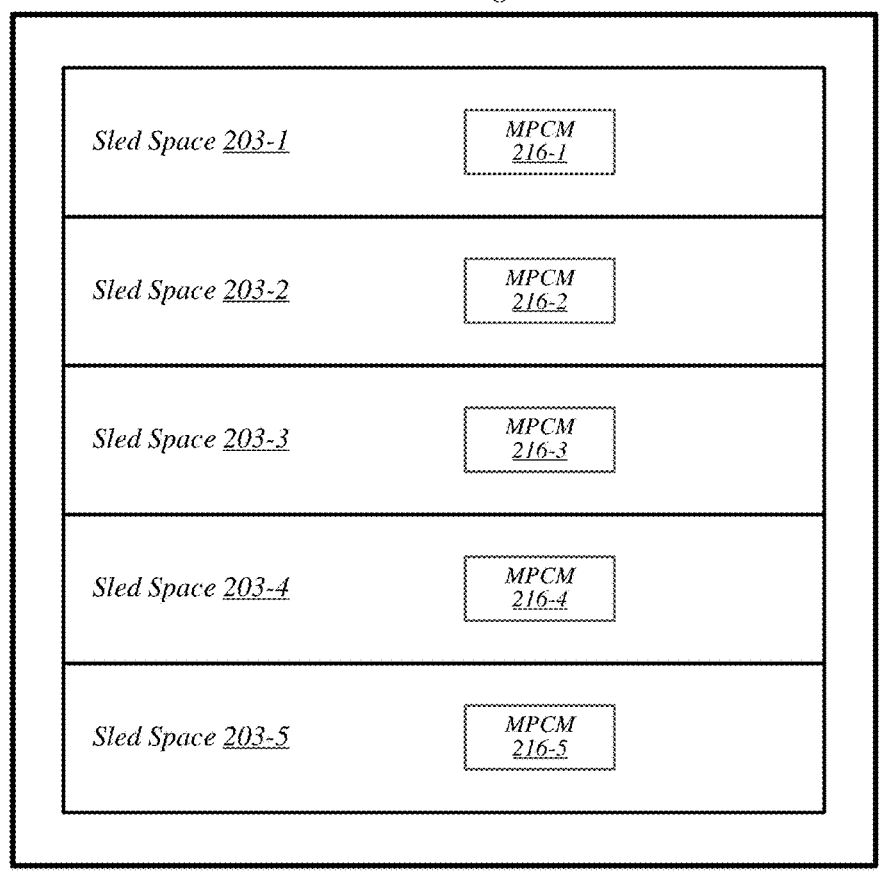
FIG. 2 illustrates a first example rack of a data center.

FIG. 2 illustrates a general overview of a rack architecture 200 that may be representative of an architecture of any particular one of the racks depicted in FIG. 1, according to some embodiments. As reflected in this figure, rack architecture 200 may generally feature a plurality of sled spaces into which sleds may be inserted, each of which may be robotically-accessible via a rack access region 201. In the particular non-limiting example depicted in this figure, rack architecture 200 features five sled spaces 203-1 to 203-5. Sled spaces 203-1 to 203-5 feature respective multi-purpose connector modules (MPCMs) 216-1 to 216-5. These MPCMs may be arranged to receive a corresponding MPCM of a sled (refer to FIGS. 5-10) to mechanically, optically, and/or electrically couple the sleds to rack architecture 200, and particularly to an optical fabric of a data center to associated power sources for each sled space 203-1 to 203-5.

Figure 3:
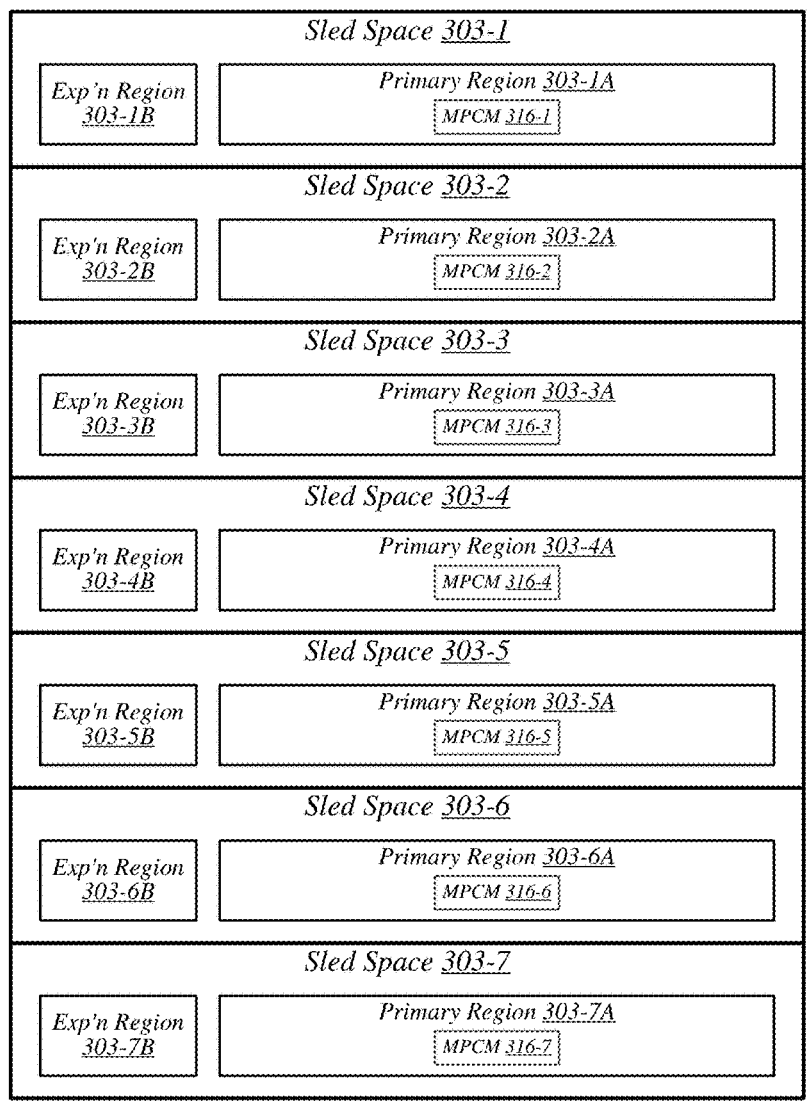
FIG. 3 illustrates a second example rack.
Figure 10:
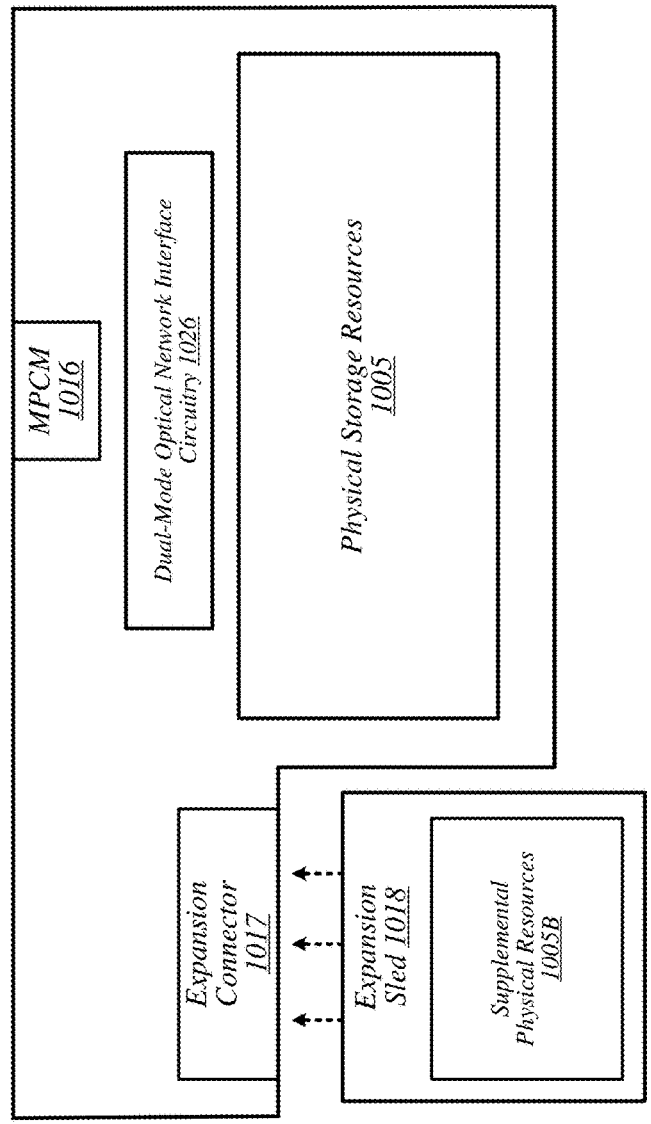
FIG. 10 illustrates a sixth example sled.

FIG. 3 illustrates an example of a rack architecture 300 that may be representative of a rack architecture that may be implemented in order to provide support for sleds featuring expansion capabilities (e.g., refer to FIG. 10). In the particular non-limiting example depicted in this figure, rack architecture 300 includes seven sled spaces 303-1 to 303-7, which feature respective MPCMs 316-1 to 316-7. Sled spaces 303-1 to 303-7 include respective primary regions 303-1A to 303-7A and respective expansion regions 303-1B to 303-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module (e.g., housing additional and/or supplemental physical resources to couple with physical resources of the main sled), in the event that the inserted sled is configured with such a module.

Figure 4:
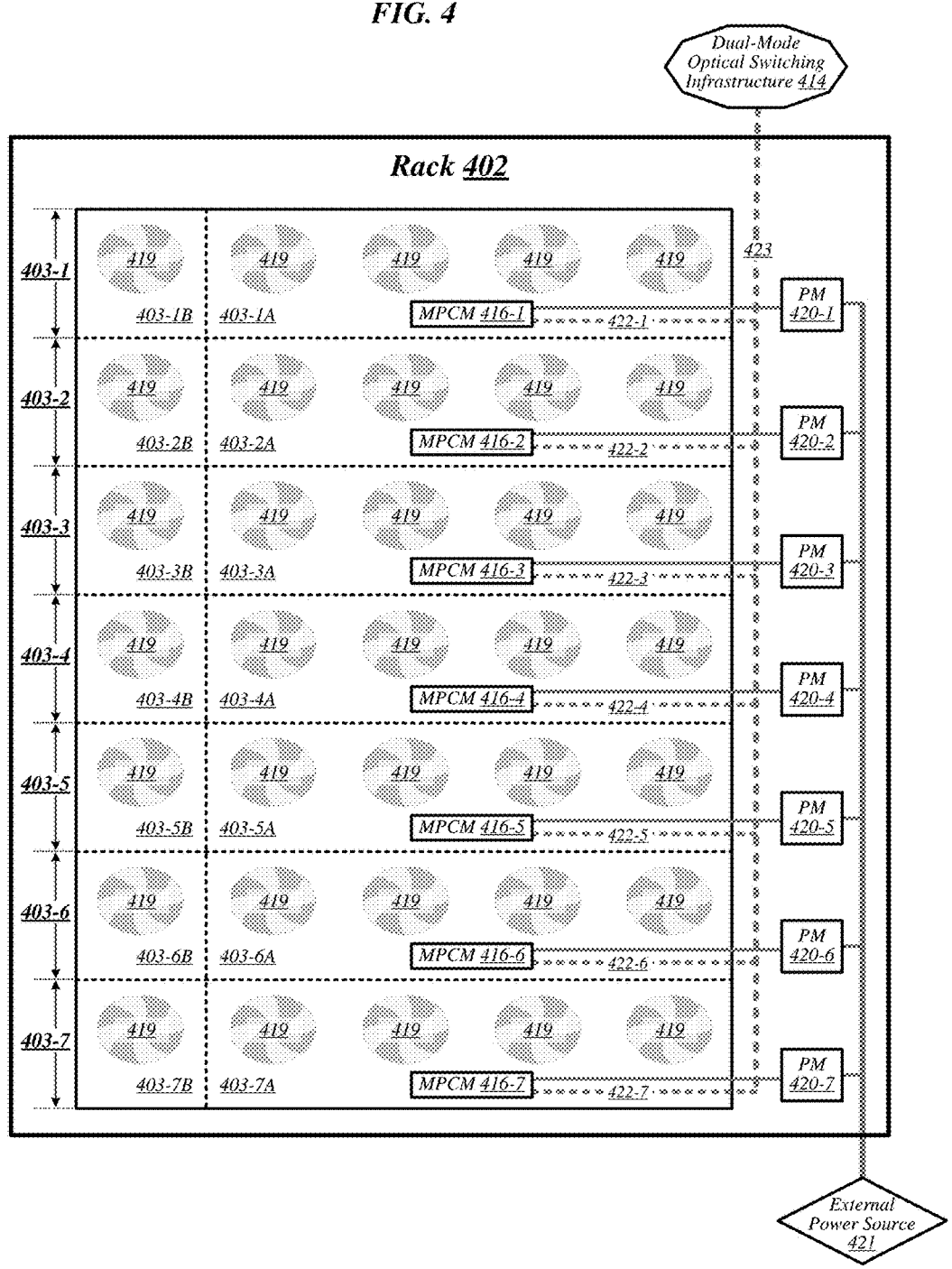
FIG. 4 illustrates a third example rack.

FIG. 4 illustrates an example of a rack 402 that may be representative of a rack implemented according to rack architecture 300 of FIG. 3 according to some embodiments. In the particular non-limiting example depicted in FIG. 4, rack 402 features seven sled spaces 403-1 to 403-7, which include respective primary regions 403-1A to 403-7A and respective expansion regions 403-1B to 403-7B. In various embodiments, temperature control in rack 402 may be implemented using an air cooling system. For example, as reflected in this figure, rack 402 may feature a plurality of fans 419 that are generally arranged to provide air cooling within the various sled spaces 403-1 to 403-7. In some embodiments, the height of the sled space is greater than the conventional "1U" server height. In such embodiments, fans 419 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 416-1 to 416-7 may be configured to provide inserted sleds with access to power sourced by respective power modules 420-1 to 420-7, each of which may draw power from an external power source 421. In various embodiments, external power source 421 may deliver alternating current (AC) power to rack 402, and power modules 420-1 to 420-7 may be configured to convert such AC power to direct current (DC) power to be sourced to inserted sleds. In some embodiments, for example, power modules 420-1 to 420-7 may be configured to convert 277-volt AC power into 12-volt DC power for provision to inserted sleds via respective MPCMs 416-1 to 416-7. The embodiments are not limited to this example.

MPCMs 416-1 to 416-7 may also be arranged to provide inserted sleds with optical signaling connectivity to an optical fabric, which may be the same as—or similar to—optical fabric 112 of FIG. 1. In various embodiments, optical connectors contained in MPCMs 416-1 to 416-7 may be designed to couple with counterpart optical connectors contained in MPCMs of inserted sleds to provide such sleds with optical signaling connectivity to optical fabric 412 via respective lengths of optical cabling 422-1 to 422-7. In some embodiments, each such length of optical cabling may extend from its corresponding MPCM to an optical interconnect loom 423 that is external to the sled spaces of rack 402. In various embodiments, optical interconnect loom 423 may be arranged to pass through a support post or other type of load-bearing element of rack 402. The embodiments are not limited in this context. Because inserted sleds connect to an optical switching infrastructure via MPCMs, the resources typically spent in manually configuring the rack cabling to accommodate a newly inserted sled can be saved.

Figure 5:
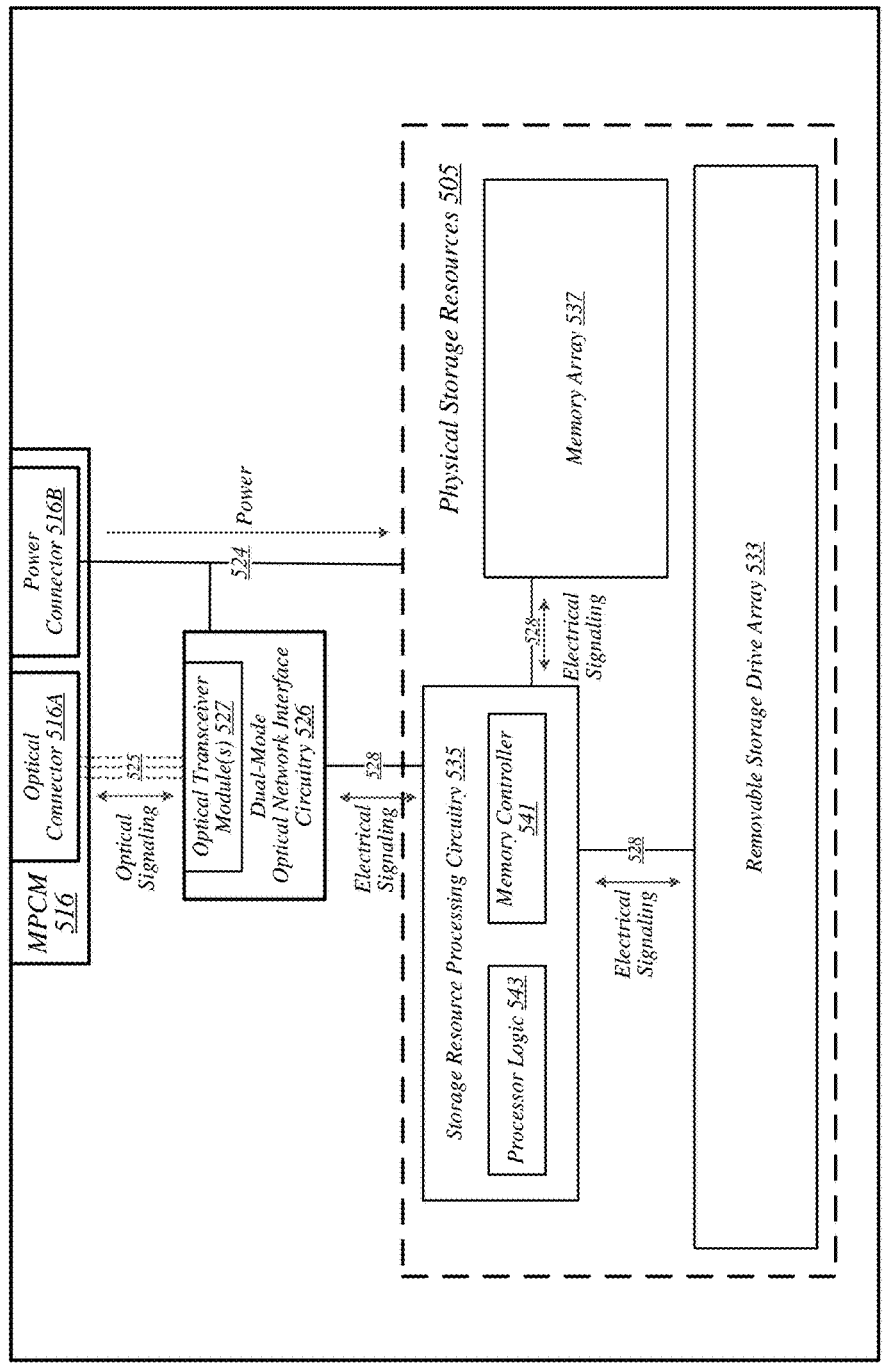
FIG. 5 illustrates a first example sled.

FIG. 5 illustrates an example of a sled 504 that may be representative of a sled designed for use in conjunction with a rack according to some embodiments (e.g., racks according to rack architectures 200 or 300 or rack 402). Sled 504 may feature an MPCM 516 that comprises an optical connector 516A and a power connector 516B, and that is designed to couple with a counterpart MPCM of a sled space in conjunction with insertion of MPCM 516 into that sled space. Coupling MPCM 516 with such a counterpart MPCM may cause power connector 516 to couple with a power connector comprised in the counterpart MPCM. This may generally enable physical storage resources 505 of sled 504 to source power from an external source, via power connector 516 and power transmission media 524 that conductively couples power connector 516 to physical storage resources 505.

Physical storage resources 505 can generally include a removable storage device array 533, storage resource processing circuitry 535, and a memory array 537. In some examples, the removable storage device array 533 can include a number of storage devices (e.g., SSDs, or the like) and can have any capacity. In some examples, the removable storage devices array 533 may have between 0.5 and 2 peta-bytes storage capacity. More specifically, with some non-limiting examples, the removable storage device array 533 can accommodate between 2 and 24 removable devices. In a particular example, removable storage drive array 533 can accommodate 4 removable drives (e.g., refer to FIG. 8). In another particular example, removable storage drive array 533 can accommodate 16 removable drives (e.g., refer to FIG. 9).

For illustration purposes only, it is assumed that the sled can accommodate 16 removable drives. In this example, where each one of the removable devices provides 32 tera-bytes of capacity, the sled 504 may provide a total of 0.5 peta-bytes of capacity. Whereas, where each one of the removable devices provides 128 tera-bytes of capacity, the sled 504 may provide a total of 2 peta-bytes of capacity.

In some examples, memory array 537 can include volatile and/or non-volatile memory. For example, memory array 537 can include a number of dual-inline memory modules (DIMMs) coupled to storage resource processing circuitry via electrical signaling media 528. In some examples, memory array 537 can include random-access memory (RAM), dynamic RAM (DRAM), synchronous DRAM (SDRAM), double-data rate SDRAM, NAND memory, NOR memory, three-dimensional (3D) cross-point memory, ferroelectric memory, silicon-oxide-nitride-oxide-silicon (SONOS) memory, polymer memory such as ferroelectric polymer memory, ferroelectric transistor random access memory (FeTRAM or FeRAM), nanowire, phase-change RAM (PRAM), resistive RAM (RRAM), magnetoresistive RAM (MRAM), spin transfer torque MRAM (STT-MRAM) memory, non-volatile static RAM (nvSRAM), conductive-bridging RAM (CBRAM), nano-RAM (NRAM), floating junction gate RAM (FJG RAM), or the like. With some examples, memory array 537 can include a combination of such memory modules, for example, a combination of DRAM and 3D cross-point memory.

Sled 504 may also include dual-mode optical network interface circuitry 526. Dual-mode optical network interface circuitry 526 may generally comprise circuitry that is capable of communicating over optical signaling media according to each of multiple link-layer protocols supported by an optical fabric (e.g., optical fabric 112 of FIG. 1, optical fabric 414 of FIG. 4, or the like). In some embodiments, dual-mode optical network interface circuitry 526 may be capable both of Ethernet protocol communications and of communications according to a second, high-performance protocol. In various embodiments, dual-mode optical network interface circuitry 526 may include one or more optical transceiver modules 527, each of which may be capable of transmitting and receiving optical signals over each of one or more optical channels. The embodiments are not limited in this context.

Coupling MPCM 516 with a counterpart MPCM of a sled space in a given rack may cause optical connector 516A to couple with an optical connector comprised in the counterpart MPCM. This may generally establish optical connectivity between optical cabling of the sled and dual-mode optical network interface circuitry 526, via each of a set of optical channels 525. With some examples, optical channels 525 comprise 4 optical fiber channels. With some examples, each of the optical channels can provide between 20 and 220 Gigabytes per second (GB/s) bandwidth. With a specific example, each of the optical channels can provide 50 GB/s bandwidth. As another specific example, each of the optical channels can provide 200 GB/s bandwidth. Dual-mode optical network interface circuitry 526 may communicate with the physical resources 505 of sled 504 via electrical signaling media 528. In addition to the dimensions of the sleds and arrangement of components on the sleds to provide improved cooling and enable operation at a relatively higher thermal envelope (e.g., 250 W), as described above with reference to FIG. 4, in some embodiments, a sled may include one or more additional features to facilitate air cooling, such as a heat pipe and/or heat sinks arranged to dissipate heat generated by physical resources 505. It is worthy of note that although the example sled 504 depicted in FIG. 5 does not feature an expansion connector, any given sled that features the design elements of sled 504 may also feature an expansion connector according to some embodiments. The embodiments are not limited in this context.

The storage resource processing circuitry 535 can include a memory controller 541 and processor logic 543. Memory controller 541 can be configured to coordinate access (e.g., writing, reading, or the like) to the devices of the removable storage drive array 533 and to memory array 537. In some examples, the storage resource processing circuitry 535 can provide caching, striping, pooling, compression, data duplication, thin provisioning, data cloning, or other data management techniques for the physical storage resources 505. In some examples, the individual devices of the removable storage device array 533 can be coupled to the storage resources processing circuitry 535 via any of a variety of busses and/or interconnects, such as, for example, peripheral component interconnect express (PCIe). In particular, the electrical signaling media 528 coupling removable storage device array 533 and storage resource processing circuitry 535 can be a 4 lane PCIe bus, to provide non-volatile memory express (NVMe) compliant logical device interconnect capabilities. In some examples, electrical signaling media 528 can operate according to a variety of interconnect standards, such as, for example, Peripheral Component Interconnect (PCI) Express Base Specification, revision 3.1a, published in December 2015 ("PCI Express specification" or "PCIe specification") the Non-Volatile Memory Express (NVMe) Specification, revision 1.2a, published in October 2015 ("NVM Express specification" or "NVMe specification"). In some examples, electrical signaling media 528 can operate based on proposed PCIe standards to be published in 2017, such as, $4^{th}$ Generation PCIe standard (PCIe Gen4).

As a specific example, where the removable storage device array 533 accommodates 16 storage devices, the electrical signaling media 528 coupling removable storage device array 533 can provide 16 PCIe Gen4×4 connections. As another example, where the removable storage device array 533 can accommodate 4 storage devices, the electrical signaling media 528 coupling removable storage device array 533 can provide 4 PCIe Gen4×4 connections.

With some examples, the electrical signaling media 528 coupling storage resource processing circuitry 535 and dual-mode optical network interface circuitry 526 can comprise PCIe Gen4 or other interface system, such as, for example a proprietary interface.

Processing logic 543 can comprise any of a variety of computer processors configured to manipulate data and/or data streams transmitted or received over electrical signaling media 528. For example, processing logic 543 can include compression logic arranged to compress and decompress data indicated in removable storage drive array 533 and/or memory array 537. As another example, processing logic 543 can include encryption logic arranged to encrypt and decrypt data indicated in removable storage drive array 533 and/or memory array 537. Furthermore, as another example, processing logic 543 can include compression logic arranged to compress and decompress data indicated in removable storage drive array 533 and/or memory array 537. Furthermore, it is noted, that although many of the examples detailed herein reference the removable storage drive array 533 as including SSDs, some embodiments of array 533 can include non-volatile memory coupled to electrical signaling media 928, for example non-volatile memory DIMMs (e.g., 3D cross-point, nvSRAM, FeRAM, MRAM, PRAM, SONOS, RRAM, NRAM, FJG RAM, CBRAM, or the like) coupled (e.g., directly, via a DIMM socket, or the like) to a processor (e.g., processor logic 543, or the like) of sled 504.

Figure 6:
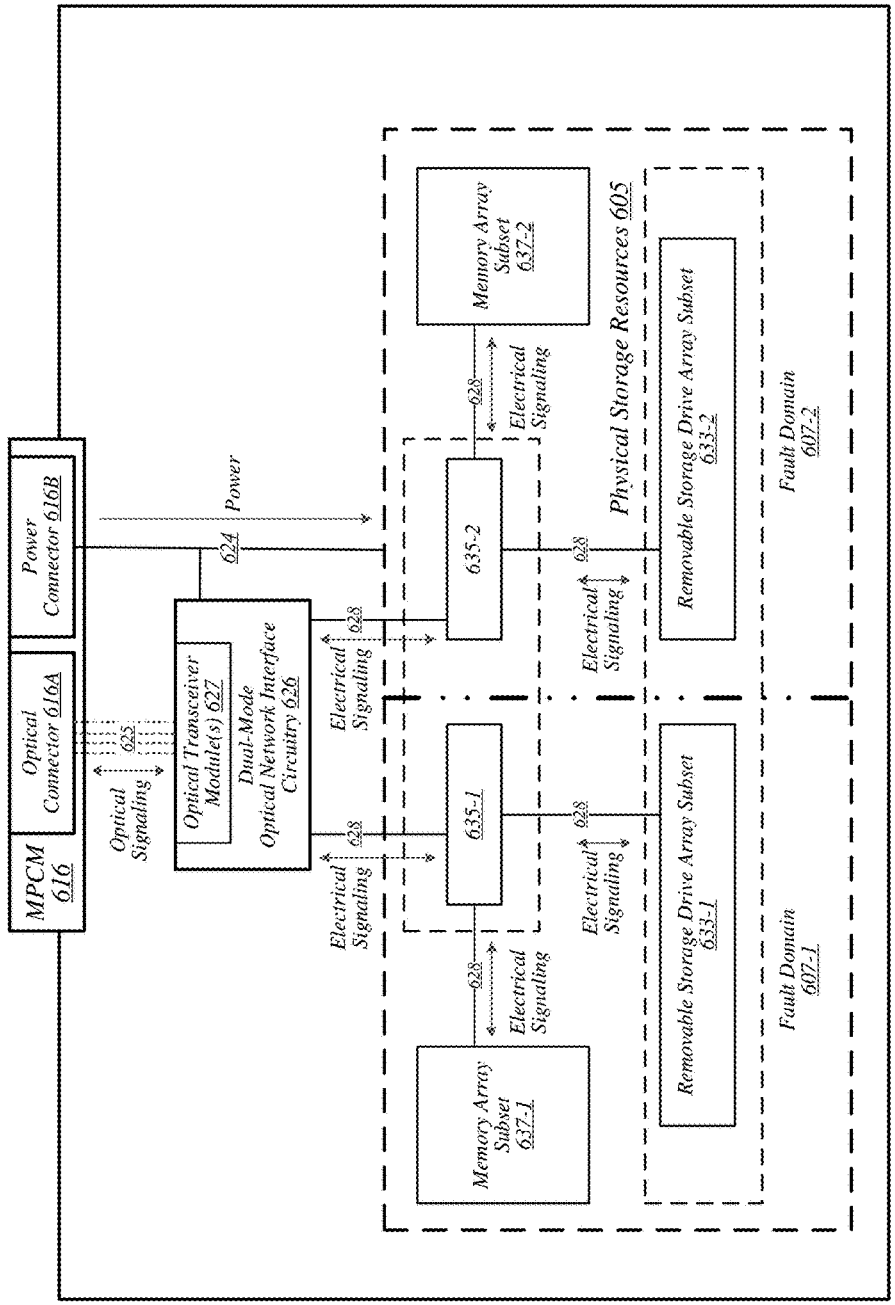
FIG. 6 illustrates a second example sled.

With some examples, removable storage drive array 533 and memory array 537 can be split into subsets or groups of removable storage drive arrays and memory arrays. In such an example, multiple storage resource processing circuitry 535 could be provided. FIG. 6 depicts such an example sled. Turning more specifically to FIG. 6, sled 604 is depicted. In general, sled 604 can comprise similar components as sled 504 of FIG. 5. However, the removable storage drive array and memory array is split into two subsets. In particular, sled 604 comprises physical storage resources 605, which include removable storage drive array subsets 633-1 to 633-2, storage resource processing circuitry 635-1 to 635-2, and memory array subsets 637-1 to 637-2. As depicted, storage resource processing circuitry 635-1 is operably couple to removable storage drive array subset 633-1 and memory array subset 637-1 while storage resource processing circuitry 635-2 is operably couple to removable storage drive array subset 633-2 and memory array subset 637-2.

Storage resource processing circuitry 635-1 and 635-2 are operably coupled to removable storage drive array subsets and memory array subsets via electrical signaling media 628. Electrical signaling media 638 can be any signaling media, such as, for example, a PCIe Gen4 bus to provide NVMe compliant logical device interconnect capabilities.

Storage resource processing circuitry 635-1 and 635-2 are further operably coupled to dual-mode optical network interface circuitry 626 via electrical signaling medial 628. It is noted, that electrical signaling media 628 coupling dual-mode optical network interface circuitry to storage resource processing circuitry 635-1 and 635-2 can be a different type, configuration, and or support a different signaling standard than electrical signaling media 628 coupling storage resource processing circuitry 635-1 and 635-2 to removable storage drive array subsets and memory array subsets. Examples are not limited in this context.

Furthermore, sled 604 can feature dual-mode optical network interface circuitry 626 including optical transceiver module(s) 627 coupled to optical connector 616A of MPCM 616 via optical channels 625. Sled 604 can additionally, feature power connector 616B of MPCM 616 to provide power to components of sled 604 via power transmission media 624.

In some embodiments, physical resources 605 can be split into multiple fault domains. In this illustrative example, sled 604 includes 2 fault domains 607-1 and 607-2. In particular: fault domain 607-1 includes storage resource processing circuitry 635-1, removable storage drive array subset 633-1, and memory array subset 637-1; while fault domain 607-2 includes storage resource processing circuitry 635-2, removable storage drive array subset 633-2 and memory array subset 637-2. Accordingly, during operation, fault domains can "fail over" to each other at the sled level to provide mitigation of data loss.

Figure 7:
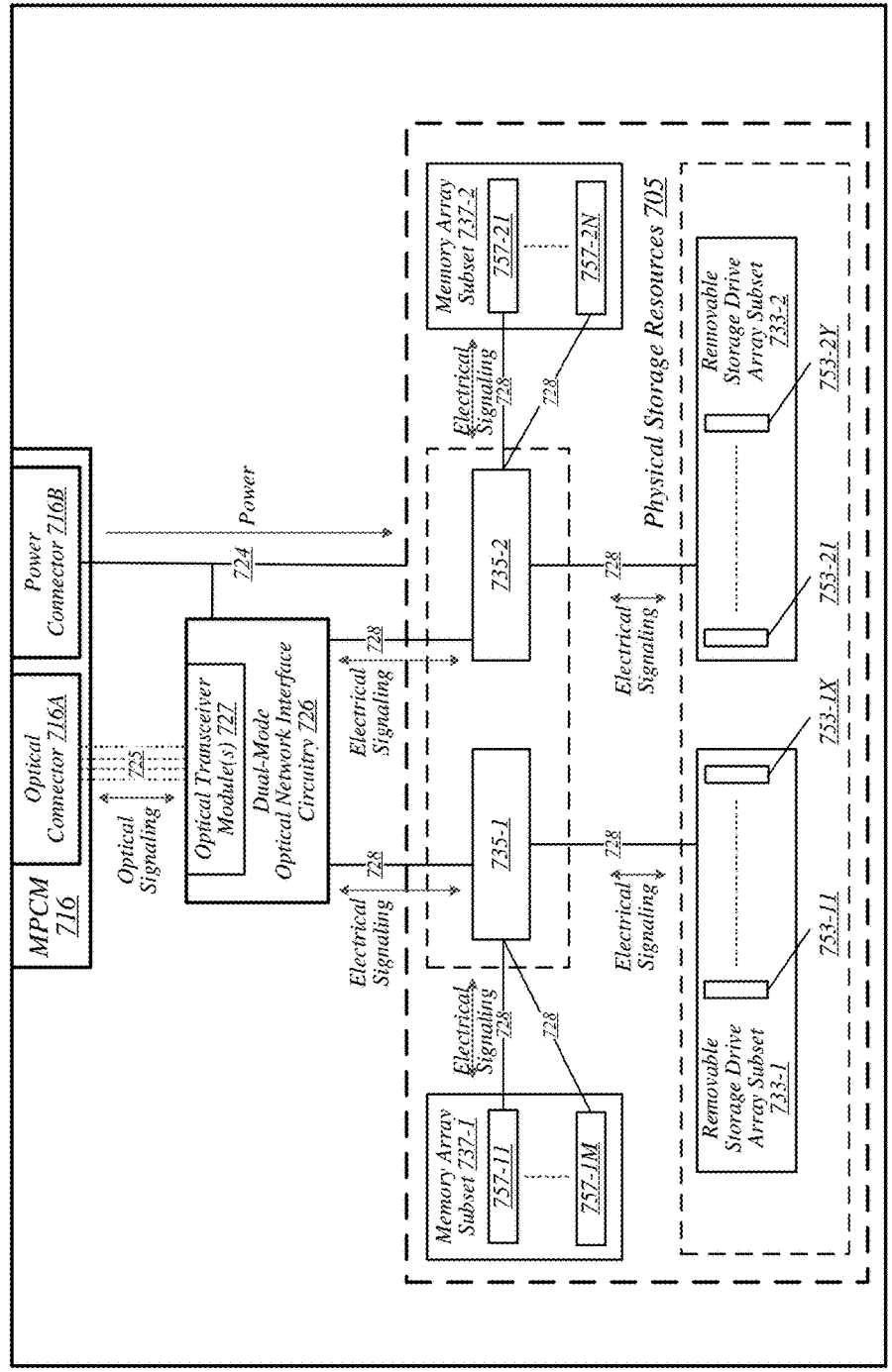
FIG. 7 illustrates a third example sled.

As noted, the removable storage drive array can include a number of storage drives (e.g., SSDs, non-volatile memory modules, or the like). Likewise, the memory array can include a number of memory modules (e.g., DIMMs, or the like). As example sled depicting individual components (e.g., drives, modules, etc.) of the arrays is depicted in FIG. 7. Turning more specifically to FIG. 7, sled 704 is depicted. In general, sled 704 can comprise similar components as sled 504 of FIG. 5 and sled 604 of FIG. 6. That is, sled 704 is depicted including multiple storage resource processing circuits and array subsets as depicted with respect to the sled 604 of FIG. 6.

In particular, sled 704 comprises physical storage resources 705, which include removable storage drive array subsets 733-1 to 733-2, storage resource processing circuitry 735-1 to 735-2, and memory array subsets 737-1 to 737-2. As depicted, storage resource processing circuitry 735-1 is operably couple to removable storage drive array subset 733-1 and memory array subset 737-1 while storage resource processing circuitry 735-2 is operably couple to removable storage drive array subset 733-2 and memory array subset 737-2.

Furthermore, removable storage drive array subsets 733-1 to 733-2 can include storage devices 753. For example, as depicted, removable storage drive array subset 733-1 includes storage devices 753-11 to 753-1X while removable storage drive array subset 733-2 includes storage devices 753-21 to 753-2Y. Similarly, memory array subset 737-1 includes memory modules 757-11 to 757-1M while memory array subset 737-2 includes memory modules 757-21 to 757-2N.

In general, storage devices 753-11 to 753-1X and 753-21 to 753-2Y can comprise any combination of a variety of non-volatile memory storage devices implemented using any of a variety of technologies, such as, for example, magnetic storage devices, semiconductor storage devices, phase-change memory storage devices, holographic data storage devices, or the like and can include devices typically characterized as SSDs or DIMMs. Memory modules 737-11 to 737-1M and 737-21 to 737-2N can include any combination of memory modules implemented using any of a variety of technologies, such as, for example, RAM, DRAM, DDRAM, synchronous DRAM, NAND memory, NOR memory, three-dimensional (3D) cross-point memory, ferroelectric memory, silicon-oxide-nitride-oxide-silicon (SONOS) memory, polymer memory such as ferroelectric polymer memory, ferroelectric transistor random access memory (FeTRAM or FeRAM), nanowire, phase change memory, magnetoresistive random access memory (MRAM), spin transfer torque MRAM (STT-MRAM) memory, or the like. With some examples, memory array 737 can include a combination of such memory modules, for example, a combination of DRAM and 3D cross-point memory.

Storage resource processing circuitry 735-1 and 735-2 are operably coupled to removable storage drive array subsets and memory array subsets via electrical signaling media 728. In particular, storage resource processing circuitry 735-1 is operably coupled to storage drives 753-11 to 753-1X of removable storage drive array subset 733-1 and memory modules 737-11 to 737-1M of memory array subset 737-1 via electrical signaling media 728. Similarly, storage resource processing circuitry 735-2 is operably coupled to storage drives 753-21 to 753-2Y of removable storage drive array subset 733-2 and memory modules 737-21 to 737-2N of memory array subset 737-2 via electrical signaling media 728.

Electrical signaling media 738 can be any signaling media, such as, for example, a PCIe Gen4 bus to provide NVMe compliant logical device interconnect capabilities.

Storage resource processing circuitry 735-1 and 735-2 are further operably coupled to dual-mode optical network interface circuitry 726 via electrical signaling medial 728. It is noted, that electrical signaling media 728 coupling dual-mode optical network interface circuitry to storage resource processing circuitry 735-1 and 735-2 can be a different type, configuration, and or support a different signaling standard than electrical signaling media 728 coupling storage resource processing circuitry 735-1 and 735-2 to removable storage drive array subsets and memory array subsets. Examples are not limited in this context.

Furthermore, sled 704 can feature dual-mode optical network interface circuitry 726 including optical transceiver module(s) 727 coupled to optical connector 716A of MPCM 716 via optical channels 725. Sled 704 can additionally, feature power connector 716B of MPCM 716 to provide power to components of sled 704 via power transmission media 724.

In some examples, the bandwidth of the physical storage resources can be described with respect to the bandwidth of the optical channels. For example, in some implementations, the bandwidth of the removable storage drive array and/or the memory array can be quantified in relationship to the bandwidth of the optical channels coupling the sled to an optical fabric of a data center. Two such examples of sleds where the bandwidth of the physical resources is described with relationship to the optical channels are depicted in FIGS. 8 and 9.

Figure 8:
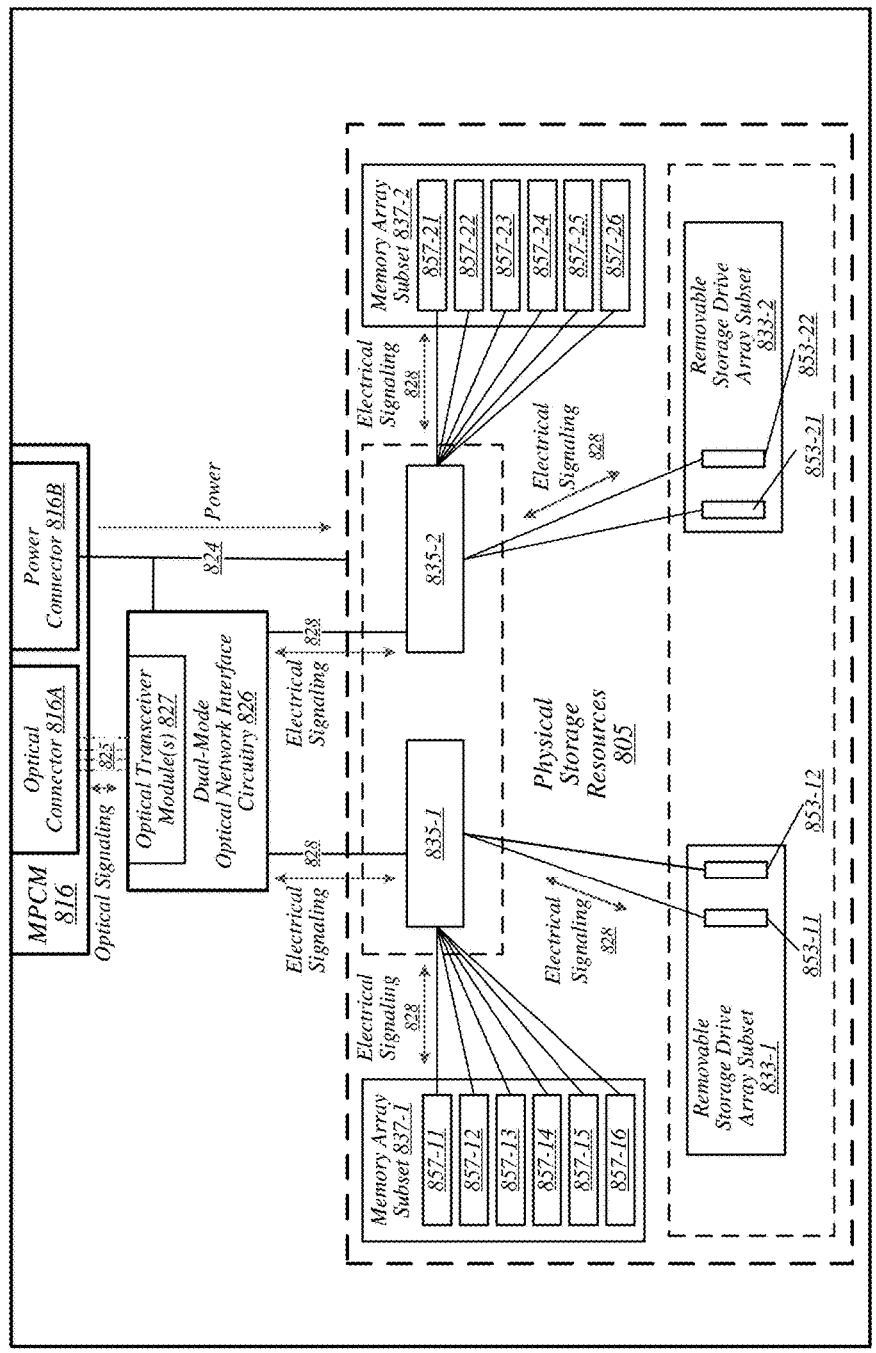
FIG. 8 illustrates a fourth example sled.
Figure 9:
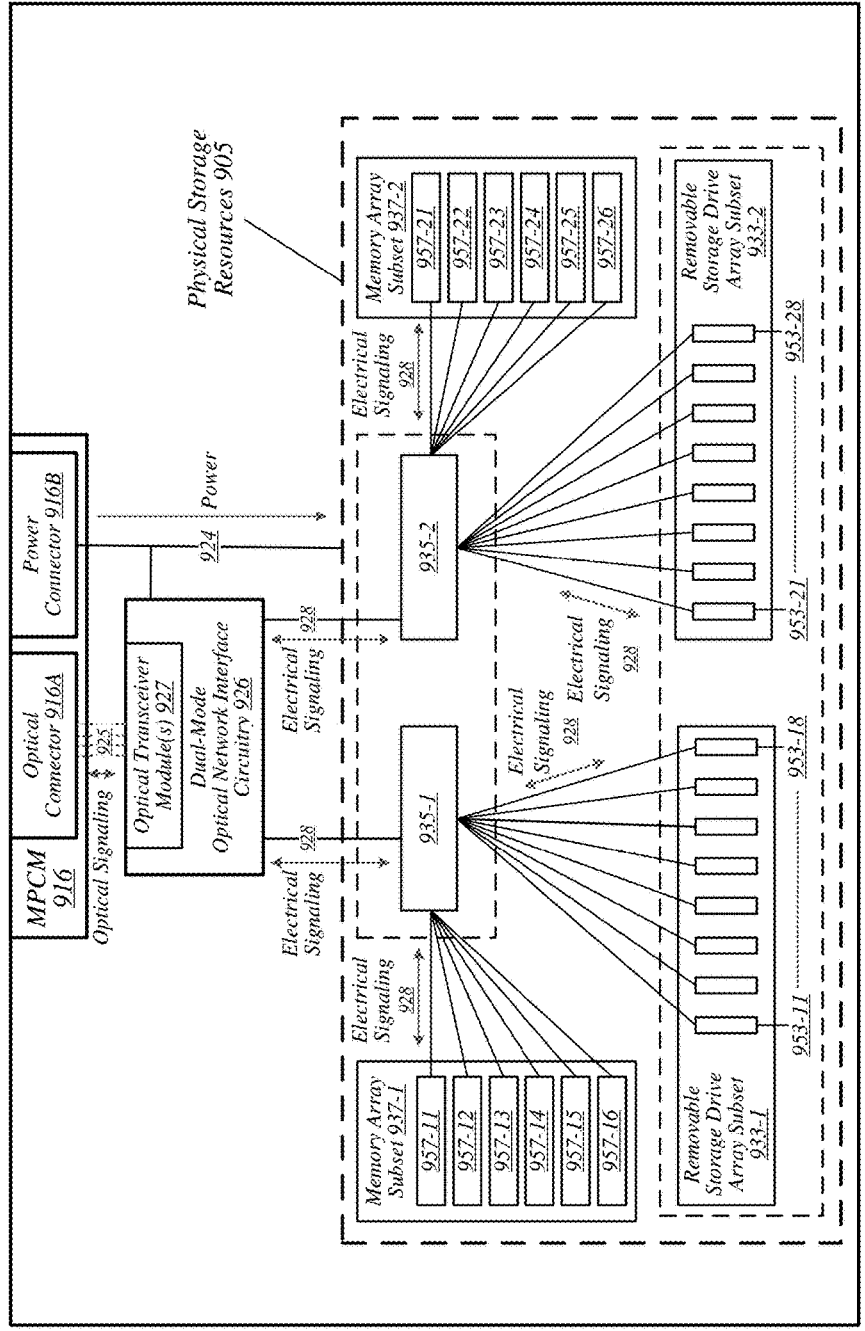
FIG. 9 illustrates a fifth example sled.

Turning more specifically to FIG. 8, a sled 804 is illustrated. In general, sled 804 can comprise similar components as sled 704 of FIG. 7. That is, sled 804 comprises physical storage resources 805, which include removable storage drive array subsets 833-1 to 833-2, storage resource processing circuitry 835-1 to 835-2, and memory array subsets 837-1 to 837-2. As depicted, storage resource processing circuitry 835-1 is operably couple to removable storage drive array subset 833-1 and memory array subset 837-1 while storage resource processing circuitry 835-2 is operably couple to removable storage drive array subset 833-2 and memory array subset 837-2.

In the depicted example, removable storage drive array subsets 833-1 to 833-2 can include storage devices 851. For example, as depicted, removable storage drive array subset 833-1 includes two storage devices 853-11 and 853-12 while removable storage drive array subset 833-2 includes two storage devices 853-21 to 853-22. Accordingly, removable storage drive array (including both removable storage drive array subsets 833-1 and 833-2) includes four individual storage devices.

Furthermore, in the depicted example, each of memory array subset 837-1 and 837-2 can include six memory modules. Specifically, memory array subset 837-1 includes memory modules 857-11 to 857-16 while memory array subset 837-2 includes memory modules 857-21 to 857-26.

In general, storage devices 853-11 to 853-12 and 853-21 to 853-22 can comprise any combination of a variety of non-volatile memory storage devices implemented using any of a variety of technologies, such as, for example, magnetic storage devices, semiconductor storage devices, phase-change memory storage devices, holographic data storage devices, or the like and can include devices typically characterized as SSDs or DIMMs.

Memory modules 837-11 to 837-16 and 837-21 to 837-26 can include any combination of memory modules implemented using any of a variety of technologies, such as, for example, RAM, DRAM, DDRAM, synchronous DRAM, NAND memory, NOR memory, three-dimensional (3D) cross-point memory, ferroelectric memory, silicon-oxide-nitride-oxide-silicon (SONOS) memory, polymer memory such as ferroelectric polymer memory, ferroelectric transistor random access memory (FeTRAM or FeRAM), nanowire, phase change memory, magnetoresistive random access memory (MRAM), spin transfer torque MRAM (STT-MRAM) memory, or the like. With some examples, memory array 837 can include a combination of such memory modules. For example, memory modules 857-11 to 857-14 and 857-21 to 857-24 can comprise DRAM DIMMs while 857-15 to 857-16 and 857-25 to 857-26 can comprise (3D) cross-point DIMMs. With some examples, a portion of the memory arrays 837-1 and 837-2 can be implemented within storage resource processing circuits 835-1 and 835-2, respectively. For example, memory modules 857-15 to 857-16 and 857-25 to 857-26 can be implemented within respective storage resource processing circuits 835-1 and 835-2.

Storage resource processing circuitry 835-1 and 835-2 are operably coupled to removable storage drive array subsets and memory array subsets via electrical signaling media 828. In particular, storage resource processing circuitry 835-1 is operably coupled to storage drives 853-11 to 853-12 of removable storage drive array subset 833-1 and memory modules 837-11 to 837-16 of memory array subset 837-1 via electrical signaling media 828. Similarly, storage resource processing circuitry 835-2 is operably coupled to storage drives 853-21 to 853-22 of removable storage drive array subset 833-2 and memory modules 837-21 to 837-26 of memory array subset 837-2 via electrical signaling media 828.

Electrical signaling media 838 can be any signaling media, such as, for example, a PCIe Gen4 bus to provide NVMe compliant logical device interconnect capabilities. In general, physical storage resources 805 can be described or can have a particular bandwidth. Said differently, physical storage resources 805 can process a specified amount or quantity data (e.g., read data, write data, read and write data, or the like) in a given time. In general, the bandwidth of the physical storage resources is a function of the bandwidth of the storage devices 853-11 to 853-12 and 853-21 to 853-22, the memory modules 857-11 to 857-16 and 857-21 to 857-26, the storage resource processing circuitry 835-1 and 835-2 and the electrical signaling media 828 coupling these components. In some examples, the bandwidth can be defined by a particular component (e.g. removable storage drive array subsets 833-1 and 833-2). In some examples, the bandwidth can be defined by all the components collectively. In some examples, the bandwidth can be defined by a limiting component (e.g., component with the smallest bandwidth, or the like). As an example, the storage resource processing circuits 835-1 and 835-2 can be configured to read and/or write data to the storage devices 853-11 to 853-12 and 853-21 to 853-22, respectively, simultaneously. Thus, the bandwidth of the physical storage resources 805 can be defined by the sum of the bandwidth of each storage device. As another example, the storage resource processing circuits 835-1 and 835-2 can be configured to read and/or write data to the storage devices 853-11 to 853-12 and 853-21 to 853-22, respectively, as well as the memory modules 857-11 to 857-16 and 857-21 to 857-26, respectively, simultaneously. Thus, the bandwidth of the physical storage resources 805 can be defined by the sum of the bandwidth of each storage device and memory module. In some examples, each of the storage devices 853-11 to 853-12 and 853-21 to 853-22 can have a bandwidth between 500 Megabytes per second (MB/s) and 20 GB/s. In some examples, each of the memory modules can have a bandwidth between 4 GB/s and 40 GB/s.

Storage resource processing circuitry 835-1 and 835-2 are further operably coupled to dual-mode optical network interface circuitry 826 via electrical signaling medial 828. It is noted, that electrical signaling media 828 coupling dual-mode optical network interface circuitry 826 to storage resource processing circuitry 835-1 and 835-2 can be a different type, configuration, and or support a different signaling standard than electrical signaling media 828 coupling storage resource processing circuitry 835-1 and 835-2 to removable storage drive array subsets and memory array subsets. Examples are not limited in this context. In some examples, the bandwidth of the physical storage resources can be defined by the bandwidth of the electrical signaling media 828 coupling dual-mode optical network interface circuitry 826 to storage resource processing circuitry 835-1 and 835-2.

Furthermore, sled 804 can feature dual-mode optical network interface circuitry 826 including optical transceiver module(s) 827 coupled to optical connector 816A of MPCM 816 via optical channels 825. Sled 804 can additionally, feature power connector 816B of MPCM 816 to provide power to components of sled 804 via power transmission media 824. The optical signaling media 825 can include a number of optical channels. Each optical channel can have a specific bandwidth. In some examples, the optical channels 825 can have a bandwidth between 20 and 80 GB/s.

With some examples, the bandwidth of the optical channels 825 can correspond to, be substantially equal to, be equal to, or be with in a threshold percentage of (e.g., 2%, 5%, 10%, or the like) of the bandwidth of the physical storage resources 805. For example, in some implementations, the bandwidth of the optical channels 825 can be substantially equal to the combined bandwidth of the storage devices 853-11 to 853-12 and 853-21 to 853-22. In some implementations, the bandwidth of the optical channels 825 can be substantially equal to the combined bandwidth of the storage devices 853-11 to 853-12 and 853-21 to 853-22 and memory modules 857-11 to 857-16 and 857-21 to 857-26. In some implementations, the bandwidth of the optical channels 825 can be substantially equal to the combined bandwidth of the memory modules 857-11 to 857-16 and 857-21 to 857-26. In some implementations, the bandwidth of the optical channels 825 can be substantially equal to the combined bandwidth of the electrical signaling medial coupling storage resource processing circuitry 835-1 and 835-2 to dual-mode optical network interface circuitry 826.

Turning more specifically to FIG. 9, a sled 904 is illustrated. In general, sled 904 can comprise similar components as sled 704 of FIG. 7. That is, sled 904 comprises physical storage resources 905, which include removable storage drive array subsets 933-1 to 933-2, storage resource processing circuitry 935-1 to 935-2, and memory array subsets 937-1 to 937-2. As depicted, storage resource processing circuitry 935-1 is operably couple to removable storage drive array subset 933-1 and memory array subset 937-1 while storage resource processing circuitry 935-2 is operably couple to removable storage drive array subset 933-2 and memory array subset 937-2.

In the depicted example, removable storage drive array subsets 933-1 to 933-2 can include storage devices 951. For example, as depicted, removable storage drive array subset 933-1 includes eight storage devices 953-11 and 953-18 while removable storage drive array subset 933-2 includes eight storage devices 953-21 to 953-28. Accordingly, removable storage drive array (including both removable storage drive array subsets 933-1 and 933-2) includes 16 individual storage devices.

Furthermore, in the depicted example, each of memory array subset 937-1 and 937-2 can include six memory modules. Specifically, memory array subset 937-1 includes memory modules 957-11 to 957-16 while memory array subset 937-2 includes memory modules 957-21 to 957-26.

In general, storage devices 953-11 to 953-18 and 953-21 to 953-28 can comprise any combination of a variety of non-volatile memory storage devices implemented using any of a variety of technologies, such as, for example, magnetic storage devices, semiconductor storage devices, phase-change memory storage devices, holographic data storage devices, or the like and can include devices typically characterized as SSDs or DIMMs.

Memory modules 937-11 to 937-16 and 937-21 to 937-26 can include any combination of memory modules implemented using any of a variety of technologies, such as, for example, RAM, DRAM, DDRAM, synchronous DRAM, NAND memory, NOR memory, three-dimensional (3D) cross-point memory, ferroelectric memory, silicon-oxide-nitride-oxide-silicon (SONOS) memory, polymer memory such as ferroelectric polymer memory, ferroelectric transistor random access memory (FeTRAM or FeRAM), nanowire, phase change memory, magnetoresistive random access memory (MRAM), spin transfer torque MRAM (STT-MRAM) memory, or the like. With some examples, memory array 937 can include a combination of such memory modules. For example, memory modules 957-11 to 957-14 and 957-21 to 957-24 can comprise DRAM DIMMs while 957-15 to 957-16 and 957-25 to 957-26 can comprise 3D cross-point DIMMs.

Storage resource processing circuitry 935-1 and 935-2 are operably coupled to removable storage drive array subsets and memory array subsets via electrical signaling media 928. In particular, storage resource processing circuitry 935-1 is operably coupled to storage drives 953-11 to 953-18 of removable storage drive array subset 933-1 and memory modules 937-11 to 937-16 of memory array subset 937-1 via electrical signaling media 928. Similarly, storage resource processing circuitry 935-2 is operably coupled to storage drives 953-21 to 953-28 of removable storage drive array subset 933-2 and memory modules 937-21 to 937-26 of memory array subset 937-2 via electrical signaling media 928.

Electrical signaling media 928 can be any signaling media, such as, for example, a PCIe Gen4 bus to provide NVMe compliant logical device interconnect capabilities. In general, physical storage resources 905 can be described or can have a particular bandwidth. Said differently, physical storage resources 905 can process a specified amount or quantity data (e.g., read data, write data, read and write data, or the like) in a given time. In general, the bandwidth of the physical storage resources is a function of the bandwidth of the storage devices 953-11 to 953-18 and 953-21 to 953-28, the memory modules 957-11 to 957-16 and 957-21 to 957-26, the storage resource processing circuitry 935-1 and 935-2 and the electrical signaling media 928 coupling these components. In some examples, the bandwidth can be defined by a particular component (e.g. removable storage drive array subsets 933-1 and 933-2). In some examples, the bandwidth can be defined by all the components collectively. In some examples, the bandwidth can be defined by a limiting component (e.g., component with the smallest bandwidth, or the like). As an example, the storage resource processing circuits 935-1 and 935-2 can be configured to read and/or write data to the storage devices 953-11 to 953-18 and 953-21 to 953-28, respectively, simultaneously. Thus, the bandwidth of the physical storage resources 905 can be defined by the sum of the bandwidth of each storage device. As another example, the storage resource processing circuits 935-1 and 935-2 can be configured to read and/or write data to the storage devices 953-11 to 953-18 and 953-21 to 953-28, respectively, as well as the memory modules 957-11 to 957-16 and 957-21 to 957-26, respectively, simultaneously. Thus, the bandwidth of the physical storage resources 905 can be defined by the sum of the bandwidth of each storage device and memory module. In some examples, each of the storage devices 953-11 to 953-18 and 953-21 to 953-2228 can have a bandwidth between 500 Megabytes per second (MB/s) and 20 GB/s. In some examples, each of the memory modules can have a bandwidth between 4 GB/s and 40 GB/s.

Storage resource processing circuitry 935-1 and 935-2 are further operably coupled to dual-mode optical network interface circuitry 926 via electrical signaling medial 928. It is noted, that electrical signaling media 928 coupling dual-mode optical network interface circuitry 926 to storage resource processing circuitry 935-1 and 935-2 can be a different type, configuration, and or support a different signaling standard than electrical signaling media 928 coupling storage resource processing circuitry 935-1 and 935-2 to removable storage drive array subsets and memory array subsets. Examples are not limited in this context. In some examples, the bandwidth of the physical storage resources can be defined by the bandwidth of the electrical signaling media 928 coupling dual-mode optical network interface circuitry 926 to storage resource processing circuitry 935-1 and 935-2.

Furthermore, sled 904 can feature dual-mode optical network interface circuitry 926 including optical transceiver module(s) 927 coupled to optical connector 916A of MPCM 916 via optical channels 925. Sled 904 can additionally, feature power connector 916B of MPCM 916 to provide power to components of sled 904 via power transmission media 924. The optical signaling media 925 can include a number of optical channels. Each optical channel can have a specific bandwidth. In some examples, the optical channels 925 can have a bandwidth between 20 and 80 GB/s.

With some examples, the bandwidth of the optical channels 925 can be less than the bandwidth of the physical storage resources 905. For example, in some implementations, the bandwidth of the optical channels 925 can be less than the combined bandwidth of the storage devices 953-11 to 953-12 and 953-21 to 953-22. In some implementations, the bandwidth of the optical channels 925 can be less than the combined bandwidth of the storage devices 953-11 to 953-12 and 953-21 to 953-22 and memory modules 957-11 to 957-16 and 957-21 to 957-26. In some implementations, the bandwidth of the optical channels 925 can be less than the combined bandwidth of the memory modules 957-11 to 957-16 and 957-21 to 957-26. In some implementations, the bandwidth of the optical channels 925 can be less than the combined bandwidth of the electrical signaling medial coupling storage resource processing circuitry 935-1 and 935-2 to dual-mode optical network interface circuitry 926.

It is noted, that the sleds 704, 804 and 904 depicted herein may not necessarily include the memory modules and storage devices depicted, but instead, can include sockets, and/or connector modules where such memory modules and storage devices can be added to the sled, for example, by a data center operator, or the like.

As noted above, with some examples, a sled can be arranged to accept an expansion sled. FIG. 10 illustrates an example of a sled 1004 that may be representative of a sled of such a type. As shown in this figure, sled 1004 may comprise a set of physical resources 1005, as well as an MPCM 1016 designed to couple with a counterpart MPCM when sled 1004 is inserted into a sled space such as any of sled spaces 303-1 to 303-7 of FIG. 3. Sled 1004 can also feature dual-mode optical network interface circuitry 1026 to couple components of sled 1004 to optical fabric of a data center.

Sled 1004 may also feature an expansion connector 1017. Expansion connector 1017 may generally comprise a socket, slot, or other type of connection element that is capable of accepting one or more types of expansion modules, such as an expansion sled 1018. By coupling with a counterpart connector on expansion sled 1018, expansion connector 1017 may provide physical resources 1005 with access to supplemental physical resources 1005B residing on expansion sled 1018.

For example, physical resources 1005 can comprise physical storage resources, such as, removable storage drive array and storage resource processing circuitry while memory modules corresponding to a memory array to be included in physical resources can be provided via supplemental physical resources 1005B on expansion sled 1018.

Figure 11:
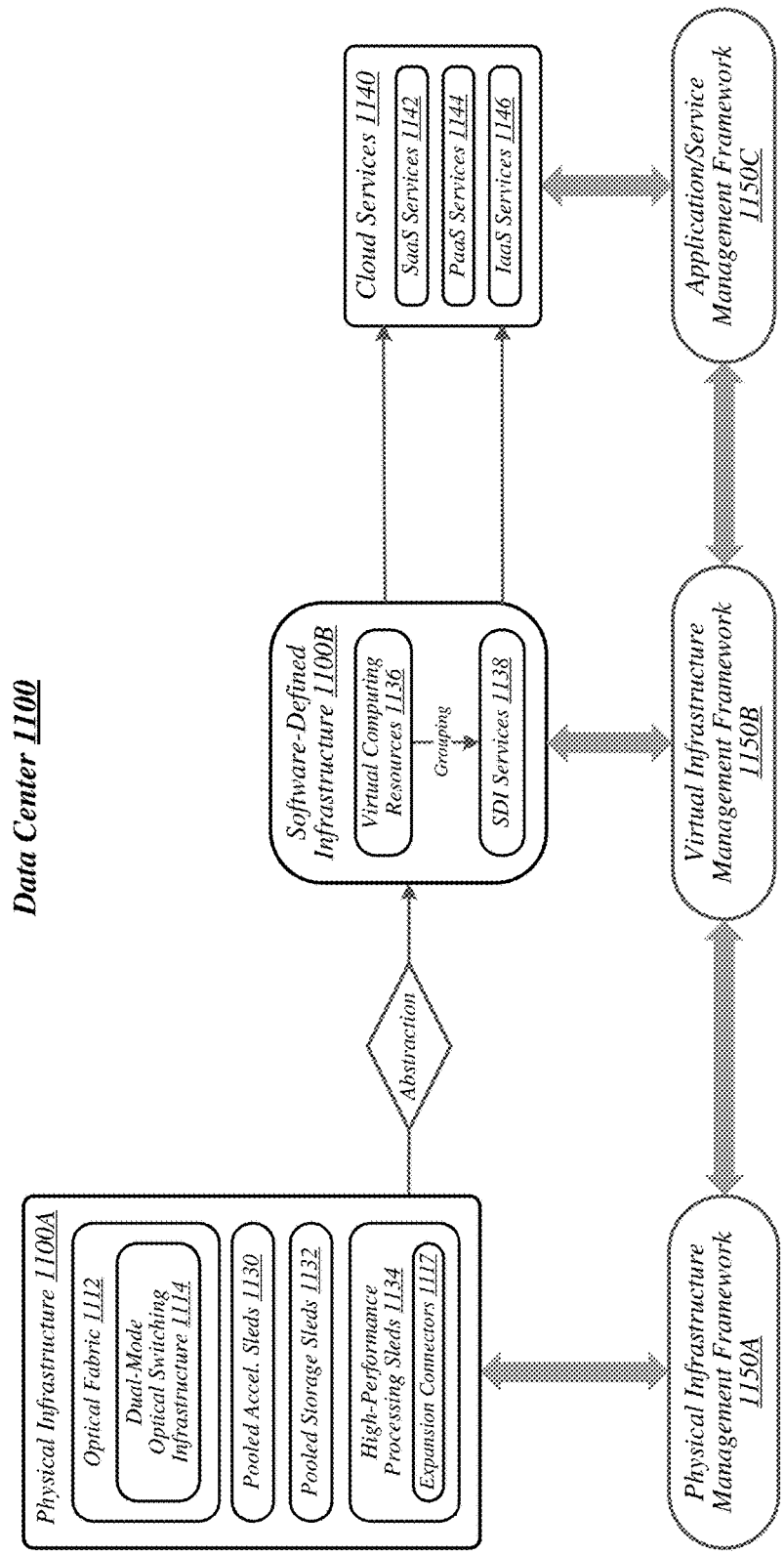
FIG. 11 illustrates a second example data center.

FIG. 11 illustrates an example of a data center 1100 that may generally be representative of one in/for which one or more techniques described herein may be implemented according to various embodiments. As reflected in this figure, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in this figure, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 112 of FIG. 1 or 412 of FIG. 4, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is available globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide quality of service (QoS) management capabilities for cloud services 1140. The embodiments are not limited in this context.

Figure 12:
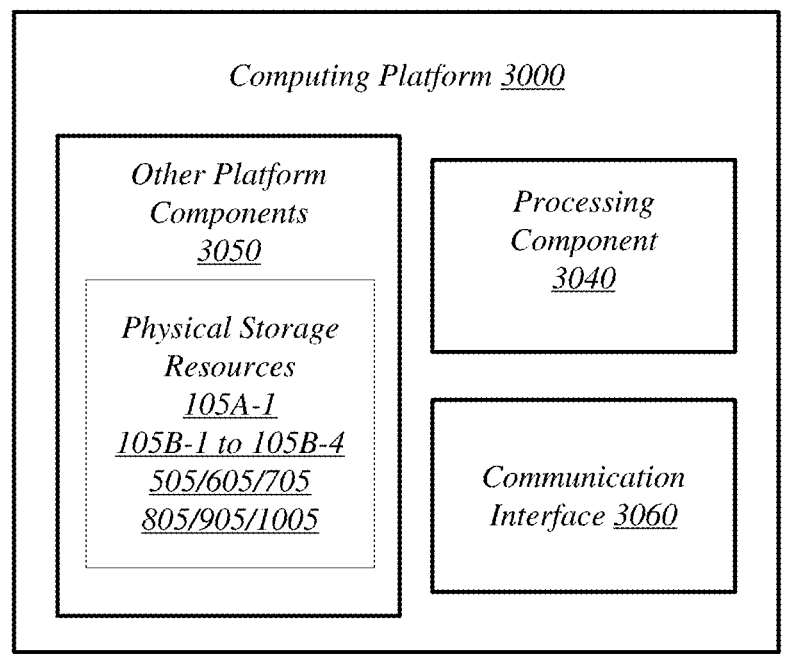
FIG. 12 illustrates an example computing platform.

FIG. 12 illustrates an example computing platform 3000. In some examples, as shown in this figure, computing platform 3000 may include any of a processing component 3040, other platform components 3050 or a communications interface 3060. According to some examples, computing platform 3000 may host physical storage resources for a data center, such as, the data centers depicted herein. Computing platform 3000 may either be a single physical server or a composed logical server that includes combinations of physical resources from a pool of configurable physical resources.

According to some examples, processing component 3040 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 3050 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, other platform components 3050 can include physical storage resources 105A-1, 105B-1 to 105B-4, 505, 605, 705, 805, 905 and/or 1005.

In some examples, communications interface 3060 may include logic and/or features to support a communication interface. For these examples, communications interface 3060 may include one or more communication interfaces that operate according to various communication protocols or standards to communicate over direct or network communication links. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Hardware Abstraction API Specification. Network communications may also occur according to the Infiniband Architecture specification or the TCP/IP protocol.

The components and features of computing platform 3000 may be implemented using any combination of discrete circuitry, application specific integrated circuits (ASICs), logic gates and/or single chip architectures. Further, the features of computing platform 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 3000 shown in the block diagram this figure may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present disclosure can be implemented in any of a variety of embodiments, such as, for example, the following non-exhaustive listing of example embodiments.

EXAMPLE 1

An apparatus for a sled of a data center, comprising: a frame to couple to a rack of a data center, the frame arranged to receive a plurality of storage devices; a group of memory sockets to receive a plurality of memory modules comprising a combination of three-dimensional (3D) cross-point memory and another type of computer-readable memory, different than the 3D cross-point memory; at least one storage resource processing circuit to couple to the plurality of storage devices and the plurality of memory modules; and a dual-mode optical network interface operably coupled to the at least one storage resource processing circuit to couple the plurality of storage devices to a network fabric.

EXAMPLE 2

The apparatus of example 1, the at least one storage resource processing circuit a plurality of storage resource processing circuits, comprising: a first storage resource processing circuit coupled to a first subset of the plurality of storage devices and a first subset of the plurality of memory modules; and a second storage resource processing circuit coupled to a second subset of the plurality of storage devices and a second subset of the plurality of memory modules.

EXAMPLE 3

The apparatus of example 2, comprising: the first storage resource processing circuit, the first subset of the plurality of storage devices, and the first subset of the plurality of memory modules corresponding to a first fault domain, and the second storage resource processing circuit, the second subset of the plurality of storage devices, and the second subset of the plurality of memory modules corresponding to a second fault domain.

EXAMPLE 4

The apparatus of example 2, the dual-mode optical network interface to provide a bandwidth substantially equal to a bandwidth of the plurality of storage devices.

EXAMPLE 5

The apparatus of example 4, the plurality of storage devices comprising between 2 and 8 storage devices.

EXAMPLE 6

The apparatus of example 2, the dual-mode optical network interface to provide a bandwidth greater than a bandwidth of the plurality of storage devices.

EXAMPLE 7

The apparatus of example 6, the plurality of storage devices comprising between 8 and 24 storage devices.

EXAMPLE 8

The apparatus of example 2, the dual-mode optical, network interface to provide a bandwidth less than a bandwidth of the plurality of storage devices.

EXAMPLE 9

The apparatus of any one of examples 1 to 8, the dual-mode network interface comprising a plurality of optical channels.

EXAMPLE 10

The apparatus of example 9, wherein the data bandwidth of each of the plurality of optical channels is between 30 and 220 Gb/s.

EXAMPLE 11

The apparatus of any one of examples 1 to 8, each of the at least one storage resource processing circuits comprising a memory controller.

EXAMPLE 12

The apparatus of any one of examples 1 to 8, each of the at least one storage resource processing circuits comprising: a memory controller; and a processing circuit, the processing circuit to apply at least one processing operation on a data stream between the at least one storage resource processing circuit and the dual-mode optical network interface.

EXAMPLE 13

The apparatus of any one of examples 1 to 8, comprising the plurality of memory modules.

EXAMPLE 14

The apparatus of any one of examples 1 to 8, comprising the plurality of storage devices.

EXAMPLE 15

The apparatus of example 14, wherein the plurality of storage devices are solid-state-drives or non-volatile memory modules.

EXAMPLE 16

The apparatus of any one of examples 1 to 8, the frame comprising a plurality of removable storage device mounting slots arranged in pairs, each pair of the plurality of removable storage device mounting slots to receive a one of the plurality of storage devices.

EXAMPLE 17

The apparatus of example 16, a one of each pair of the plurality of removable storage device mounting slots disposed on a lower portion of the frame and the other one of each pair of the plurality of removable storage device mounting slots disposed on an upper portion of the frame to retain each of the plurality of storage devices vertically.

EXAMPLE 18

The apparatus of example 17, each pair of the plurality of removable storage device mounting slots spaced apart from another pair of the plurality of removable storage device mounting slots a distance sufficient to robotically insert and remove the plurality of storage devices.

EXAMPLE 19

A system for a rack of a data center, comprising: a rack comprising a plurality of sled spaces each arranged to accept a sled; and at least one sled, comprising: a frame to couple to a rack of a data center, the frame arranged to receive a plurality of storage devices; a group of memory sockets to receive a plurality of memory modules comprising a combination of three-dimensional (3D) cross-point memory and another type of computer-readable memory, different than the 3D cross-point memory; at least one storage resource processing circuit to couple to the plurality of storage devices and the plurality of memory modules; and a dual-mode optical network interface operably coupled to the at least one storage resource processing circuit to couple the plurality of storage devices to a network fabric.

EXAMPLE 20

The system of example 19, the at least one storage resource processing circuit a plurality of storage resource processing circuits, comprising: a first storage resource processing circuit coupled to a first subset of the plurality of storage devices and a first subset of the plurality of memory modules; and a second storage resource processing circuit coupled to a second subset of the plurality of storage devices and a second subset of the plurality of memory modules.

EXAMPLE 21

The system of example 20, comprising: the first storage resource processing circuit, the first subset of the plurality of storage devices, and the first subset of the plurality of memory modules corresponding to a first fault domain, and the second storage resource processing circuit, the second subset of the plurality of storage devices, and the second subset of the plurality of memory modules corresponding to a second fault domain.

EXAMPLE 22

The system of example 20, the dual-mode optical network interface to provide a bandwidth substantially equal to a bandwidth of the plurality of storage devices.

EXAMPLE 23

The system of example 22, the plurality of storage devices comprising between 2 and 8 storage devices.

EXAMPLE 24

The system of example 20, the dual-mode optical network interface to provide a bandwidth greater than a bandwidth of the plurality of storage devices.

EXAMPLE 25

The system of example 24, the plurality of storage devices comprising between 8 and 24 storage devices.

EXAMPLE 26

The system of example 20, the dual-mode optical, network interface to provide a bandwidth less than a bandwidth of the plurality of storage devices.

EXAMPLE 27

The system of any one of examples 18 to 26, the dual-mode network interface comprising a plurality of optical channels.

EXAMPLE 28

The system of example 27, wherein the data bandwidth of each of the plurality of optical channels is between 30 and 220 Gb/s.

EXAMPLE 29

The system of any one of examples 18 to 26, each of the at least one storage resource processing circuits comprising a memory controller.

EXAMPLE 30

The system of any one of examples 18 to 26, each of the at least one storage resource processing circuits comprising: a memory controller; and a processing circuit, the processing circuit to apply at least one processing operation on a data stream between the at least one storage resource processing circuit and the dual-mode optical network interface.

EXAMPLE 31

The system of any one of examples 18 to 26, comprising the plurality of memory modules.

EXAMPLE 32

The system of any one of examples 18 to 26, comprising the plurality of storage devices.

EXAMPLE 33

The system of example 30, wherein the plurality of storage devices are solid-state-drives or non-volatile memory modules.

EXAMPLE 34

The system of any one of examples 18 to 26, the frame comprising a plurality of removable storage device mounting slots arranged in pairs, each pair of the plurality of removable storage device mounting slots to receive a one of the plurality of storage devices.

EXAMPLE 35

The system of example 34, a one of each pair of the plurality of removable storage device mounting slots disposed on a lower portion of the frame and the other one of each pair of the plurality of removable storage device mounting slots disposed on an upper portion of the frame to retain each of the plurality of storage devices vertically.

EXAMPLE 36

The system of example 35, each pair of the plurality of removable storage device mounting slots spaced apart from another pair of the plurality of removable storage device mounting slots a distance sufficient to robotically insert and remove the plurality of storage devices.

EXAMPLE 37

An apparatus for a sled of a data center, comprising: a frame to couple to a rack of a data center, the frame arranged to receive a plurality of storage devices; a group of memory sockets to receive a plurality of memory modules of a first type of memory; at least one storage resource processing circuit to couple to the plurality of storage devices and the plurality of memory modules, the at least one storage resource processing circuit comprising a memory array of a second type of memory, different than the first type of memory; and a dual-mode optical network interface operably coupled to the at least one storage resource processing circuit to couple the plurality of storage devices to a network fabric.

EXAMPLE 38

The apparatus of example 37, wherein the first type of memory is dynamic random access memory (DRAM).

EXAMPLE 39

The apparatus of example 38, wherein the second type of memory is three-dimensional (3D) cross-point memory.

EXAMPLE 40

The apparatus of example 39, the at least one storage resource processing circuit a plurality of storage resource processing circuits, comprising: a first storage resource processing circuit coupled to a first subset of the plurality of storage devices and a first subset of the plurality of memory modules; and a second storage resource processing circuit coupled to a second subset of the plurality of storage devices and a second subset of the plurality of memory modules.

EXAMPLE 41

The apparatus of example 39, comprising: the first storage resource processing circuit, the first subset of the plurality of storage devices, and the first subset of the plurality of memory modules corresponding to a first fault domain, and the second storage resource processing circuit, the second subset of the plurality of storage devices, and the second subset of the plurality of memory modules corresponding to a second fault domain.

EXAMPLE 42

The apparatus of example 39, the dual-mode optical network interface to provide a bandwidth substantially equal to a bandwidth of the plurality of storage devices.

EXAMPLE 43

The apparatus of example 42, the plurality of storage devices comprising between 2 and 8 storage devices.

EXAMPLE 44

The apparatus of example 39, the dual-mode optical network interface to provide a bandwidth greater than a bandwidth of the plurality of storage devices.

EXAMPLE 45

The apparatus of example 44, the plurality of storage devices comprising between 8 and 24 storage devices.

EXAMPLE 46

The apparatus of example 39, the dual-mode optical, network interface to provide a bandwidth less than a bandwidth of the plurality of storage devices.

EXAMPLE 47

The apparatus of any one of examples 37 to 46, the dual-mode network interface comprising a plurality of optical channels.

EXAMPLE 48

The apparatus of example 47, wherein the data bandwidth of each of the plurality of optical channels is between 30 and 220 Gb/s.

EXAMPLE 49

The apparatus of any one of examples 37 to 46, each of the at least one storage resource processing circuits comprising a memory controller.

EXAMPLE 50

The apparatus of any one of examples 37 to 46, each of the at least one storage resource processing circuits comprising: a memory controller; and a processing circuit, the processing circuit to apply at least one processing operation on a data stream between the at least one storage resource processing circuit and the dual-mode optical network interface.

EXAMPLE 51

The apparatus of any one of examples 37 to 46, comprising the plurality of memory modules.

EXAMPLE 52

The apparatus of any one of examples 37 to 46, comprising the plurality of storage devices.

EXAMPLE 53

The apparatus of example 52, wherein the plurality of storage devices are solid-state-drives or non-volatile memory modules.

EXAMPLE 54

The apparatus of any one of examples 37 to 46, the frame comprising a plurality of removable storage device mounting slots arranged in pairs, each pair of the plurality of removable storage device mounting slots to receive a one of the plurality of storage devices.

EXAMPLE 55

The apparatus of example 54, a one of each pair of the plurality of removable storage device mounting slots disposed on a lower portion of the frame and the other one of each pair of the plurality of removable storage device mounting slots disposed on an upper portion of the frame to retain each of the plurality of storage devices vertically.

EXAMPLE 56

The apparatus of example 55, each pair of the plurality of removable storage device mounting slots spaced apart from another pair of the plurality of removable storage device mounting slots a distance sufficient to robotically insert and remove the plurality of storage devices.

EXAMPLE 57

An apparatus for a sled of a data center, comprising: a frame to couple to a rack of a data center, the frame arranged to receive a plurality of storage devices; a group of memory sockets to receive a plurality of memory modules of a first type of memory; at least one storage resource processing means to couple to the plurality of storage devices and the plurality of memory modules, the at least one storage resource processing circuit comprising a memory array of a second type of memory, different than the first type of memory; and a dual-mode optical network interface means operably coupled to the at least one storage resource processing circuit to couple the plurality of storage devices to a network fabric.

EXAMPLE 58

The apparatus of example 57, wherein the first type of memory is dynamic random access memory (DRAM).

EXAMPLE 59

The apparatus of example 58, wherein the second type of memory is three-dimensional (3D) cross-point memory.

EXAMPLE 60

The apparatus of example 59, the at least one storage resource processing circuit means a plurality of storage resource processing circuit means, comprising: a first storage resource processing circuit means coupled to a first subset of the plurality of storage devices and a first subset of the plurality of memory modules; and a second storage resource processing circuit means coupled to a second subset of the plurality of storage devices and a second subset of the plurality of memory modules.

EXAMPLE 61

The apparatus of example 59, comprising: the first storage resource processing circuit means, the first subset of the plurality of storage devices, and the first subset of the plurality of memory modules corresponding to a first fault domain, and the second storage resource processing circuit means, the second subset of the plurality of storage devices, and the second subset of the plurality of memory modules corresponding to a second fault domain.

EXAMPLE 62

The apparatus of example 59, the dual-mode optical network interface means to provide a bandwidth substantially equal to a bandwidth of the plurality of storage devices.

EXAMPLE 63

The apparatus of example 62, the plurality of storage devices comprising between 2 and 8 storage devices.

EXAMPLE 64

The apparatus of example 59, the dual-mode optical network interface means to provide a bandwidth greater than a bandwidth of the plurality of storage devices.

EXAMPLE 65

The apparatus of example 64, the plurality of storage devices comprising between 8 and 24 storage devices.

EXAMPLE 66

The apparatus of example 59, the dual-mode optical, network interface means to provide a bandwidth less than a bandwidth of the plurality of storage devices.

EXAMPLE 67

The apparatus of any one of examples 57 to 66, the dual-mode network interface means comprising a plurality of optical channels.

EXAMPLE 68

The apparatus of example 67, wherein the data bandwidth of each of the plurality of optical channels is between 30 and 220 Gb/s.

EXAMPLE 69

The apparatus of any one of examples 57 to 66, each of the at least one storage resource processing circuit means comprising a memory controller.

EXAMPLE 70

The apparatus of any one of examples 57 to 66, each of the at least one storage resource processing circuit means comprising: a memory controller; and a processing circuit, the processing circuit to apply at least one processing operation on a data stream between the at least one storage resource processing circuit and the dual-mode optical network interface.

EXAMPLE 71

A method for a sled of a rack of a data center, comprising: receiving, at a group of memory sockets, a plurality of memory modules comprising a combination of three-dimensional (3D) cross-point memory and another type of computer-readable memory, different than the 3D cross-point memory; coupling, via at least one storage resource processing circuit, a plurality of storage devices to the plurality of memory modules; and coupling, via a dual-mode optical network interface coupled to the at least one storage resource processing circuit, the plurality of storage devices to a network fabric.

EXAMPLE 72

The method of example 71, the rack comprising a plurality of sled spaces each arranged to accept the sled.

EXAMPLE 73

The method of example 72, the sled comprising a frame arranged to receive the plurality of storage devices.

EXAMPLE 74

The method of example 71, the at least one storage resource processing circuit a plurality of storage resource processing circuits, the method comprising: coupling, via a first storage resource processing circuit of the plurality of storage resource processing circuits, to a first subset of the plurality of storage devices and a first subset of the plurality of memory modules; and coupling, via a second storage resource processing circuit of the plurality of storage resource processing circuits, to a second subset of the plurality of storage devices and a second subset of the plurality of memory modules.

EXAMPLE 75

The method of example 74, comprising: the first storage resource processing circuit, the first subset of the plurality of storage devices, and the first subset of the plurality of memory modules corresponding to a first fault domain, and the second storage resource processing circuit, the second subset of the plurality of storage devices, and the second subset of the plurality of memory modules corresponding to a second fault domain.

EXAMPLE 76

The method of example 74, comprising providing, via the dual-mode optical network interface, a bandwidth substantially equal to a bandwidth of the plurality of storage devices.

EXAMPLE 77

The method of example 76, the plurality of storage devices comprising between 2 and 8 storage devices.

EXAMPLE 78

The method of example 74, comprising providing, via the dual-mode optical network interface, a bandwidth greater than a bandwidth of the plurality of storage devices.

EXAMPLE 79

The method of example 78, the plurality of storage devices comprising between 8 and 24 storage devices.

EXAMPLE 80

The method of example 74, comprising providing, via the dual-mode optical network interface, a bandwidth less than a bandwidth of the plurality of storage devices.

EXAMPLE 81

The method of any one of examples 71 to 80, the dual-mode network interface comprising a plurality of optical channels.

EXAMPLE 82

The method of example 81, wherein the data bandwidth of each of the plurality of optical channels is between 30 and 220 Gb/s.

EXAMPLE 83

The method of any one of examples 71 to 80, each of the at least one storage resource processing circuits comprising a memory controller.

EXAMPLE 84

The method of any one of examples 71 to 80, each of the at least one storage resource processing circuits comprising: a memory controller; and a processing circuit, the processing circuit to apply at least one processing operation on a data stream between the at least one storage resource processing circuit and the dual-mode optical network interface.

EXAMPLE 85

The method of any one of examples 71 to 80, wherein the plurality of storage devices are solid-state-drives or non-volatile memory modules.

EXAMPLE 86

The method of example 73, the frame comprising a plurality of removable storage device mounting slots arranged in pairs, each pair of the plurality of removable storage device mounting slots to receive a one of the plurality of storage devices.

EXAMPLE 87

The method of example 86, a one of each pair of the plurality of removable storage device mounting slots disposed on a lower portion of the frame and the other one of each pair of the plurality of removable storage device mounting slots disposed on an upper portion of the frame to retain each of the plurality of storage devices vertically.

EXAMPLE 88

The method of example 87, each pair of the plurality of removable storage device mounting slots spaced apart from another pair of the plurality of removable storage device mounting slots a distance sufficient to robotically insert and remove the plurality of storage devices.

What is claimed is:
1. An apparatus for a sled of a data center, comprising:
   a frame to couple to a rack of the data center, the frame arranged to receive a plurality of storage devices;
   a group of memory sockets to receive a plurality of memory modules comprising a combination of three-dimensional (3D) cross-point memory and another type of computer-readable memory, different than the 3D cross-point memory;

at least one storage resource processing circuit to couple
to the plurality of storage devices and the plurality of
memory modules; and
a dual-mode optical network interface operably coupled
to the at least one storage resource processing circuit to
couple the plurality of storage devices to a network
fabric.

2. The apparatus of claim 1, the at least one storage resource processing circuit including a plurality of storage resource processing circuits, comprising:
a first storage resource processing circuit coupled to a first subset of the plurality of storage devices and a first subset of the plurality of memory modules; and
a second storage resource processing circuit coupled to a second subset of the plurality of storage devices and a second subset of the plurality of memory modules.

3. The apparatus of claim 2, comprising: the first storage resource processing circuit, the first subset of the plurality of storage devices, and the first subset of the plurality of memory modules corresponding to a first fault domain, and the second storage resource processing circuit, the second subset of the plurality of storage devices, and the second subset of the plurality of memory modules corresponding to a second fault domain.

4. The apparatus of claim 3, the dual-mode optical network interface to provide a bandwidth substantially equal to a bandwidth of the plurality of storage devices.

5. The apparatus of claim 3, the dual-mode optical network interface to provide a bandwidth greater than a bandwidth of the plurality of storage devices.

6. The apparatus of claim 1, the plurality of storage devices comprising between 4 and 24 storage devices.

7. The apparatus of claim 1, the dual-mode optical network interface comprising a plurality of optical channels, wherein a data bandwidth of each of the plurality of optical channels is between 30 and 220 Gigabytes per second (Gb/s).

8. The apparatus of claim 1, each of the at least one storage resource processing circuit comprising:
a memory controller; and
a processing circuit, the processing circuit to apply at least one processing operation on a data stream between the at least one storage resource processing circuit and the dual-mode optical network interface.

9. The apparatus of claim 1, comprising the plurality of memory modules and the plurality of storage devices.

10. A system for a rack of a data center, comprising:
the rack comprising a plurality of sled spaces each arranged to accept at least one sled; and
the at least one sled, comprising:
a frame to couple to the rack of the data center, the frame arranged to receive a plurality of storage devices;
a group of memory sockets to receive a plurality of memory modules comprising a combination of three-dimensional (3D) cross-point memory and another type of computer-readable memory, different than the 3D cross-point memory;
at least one storage resource processing circuit to couple to the plurality of storage devices and the plurality of memory modules; and
a dual-mode optical network interface operably coupled to the at least one storage resource processing circuit to couple the plurality of storage devices to a network fabric.

11. The system of claim 10, the at least one storage resource processing circuit including a plurality of storage resource processing circuits, comprising:
a first storage resource processing circuit coupled to a first subset of the plurality of storage devices and a first subset of the plurality of memory modules; and
a second storage resource processing circuit coupled to a second subset of the plurality of storage devices and a second subset of the plurality of memory modules.

12. The system of claim 11, the dual-mode optical network interface to provide a bandwidth substantially equal to a bandwidth of the plurality of storage devices.

13. The system of claim 11, the dual-mode optical network interface to provide a bandwidth greater than a bandwidth of the plurality of storage devices.

14. The system of claim 10, the plurality of storage devices comprising between 4 and 24 storage devices.

15. The system of claim 10, each of the at least one storage resource processing circuit comprising:
a memory controller; and
a processing circuit, the processing circuit to apply at least one processing operation on a data stream between the at least one storage resource processing circuit and the dual-mode optical network interface.

16. The system of claim 10, comprising the plurality of memory modules and the plurality of storage devices.

17. The system of claim 16, wherein the plurality of storage devices are solid-state-drives.

18. The system of claim 10, the frame comprising a plurality of removable storage device mounting slots arranged in pairs, each pair of the plurality of removable storage device mounting slots to receive a one of the plurality of storage devices.

19. The system of claim 18, a one of each pair of the plurality of removable storage device mounting slots disposed on a lower portion of the frame and an other one of each pair of the plurality of removable storage device mounting slots disposed on an upper portion of the frame to retain each of the plurality of storage devices vertically.

20. The system of claim 19, each pair of the plurality of removable storage device mounting slots spaced apart from another pair of the plurality of removable storage device mounting slots a distance sufficient to robotically insert and remove the plurality of storage devices.

21. An apparatus for a sled of a data center, comprising:
a frame to couple to a rack of the data center, the frame arranged to receive a plurality of storage devices;
a group of memory sockets to receive a plurality of memory modules of a first type of memory;
at least one storage resource processing circuit to couple to the plurality of storage devices and the plurality of memory modules, the at least one storage resource processing circuit coupled to a memory array of a second type of memory, different than the first type of memory; and
a dual-mode optical network interface operably coupled to the at least one storage resource processing circuit to couple the plurality of storage devices to a network fabric.

22. The apparatus of claim 21, wherein the first type of memory is dynamic random access memory (DRAM) and the second type of memory is three-dimensional (3D) cross-point memory.

23. The apparatus of claim 22, the dual-mode optical network interface to provide a bandwidth substantially equal to a bandwidth of the plurality of storage devices.

24. The apparatus of claim 21, the dual-mode optical network interface to provide a bandwidth greater than a bandwidth of the plurality of storage devices.

25. The apparatus of claim 21, comprising the plurality of memory modules and the plurality of storage devices and each of the at least one storage resource processing circuit comprising a memory controller.

* * * * *